United States Patent
Wang et al.

(10) Patent No.: US 8,790,814 B2
(45) Date of Patent: *Jul. 29, 2014

(54) INORGANIC NANO SHEET-ENABLED LITHIUM-EXCHANGING SURFACE-MEDIATED CELLS

(75) Inventors: Yanbo Wang, Fairborn, OH (US); Guorong Chen, Fairborn, OH (US); Zhenning Yu, Fairborn, OH (US); Bor Z. Jang, Centerville, OH (US); Aruna Zhamu, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 227 days.

This patent is subject to a terminal disclaimer.

(21) Appl. No.: 13/385,366

(22) Filed: Feb. 16, 2012

(65) Prior Publication Data
US 2013/0216894 A1    Aug. 22, 2013

(51) Int. Cl.
*H01M 10/05*    (2010.01)

(52) U.S. Cl.
USPC ........................................ 429/158

(58) Field of Classification Search
None
See application file for complete search history.

(56) References Cited

U.S. PATENT DOCUMENTS

2013/0171502 A1 * 7/2013 Chen et al. .................. 429/149

OTHER PUBLICATIONS

U.S. Appl. No. 12/930,294, filed Jan. 3, 2011, A. Zhamu, et al.
U.S. Appl. No. 12/928,927, filed Dec. 23, 2010, A. Zhamu, et al.
U.S. Appl. No. 12/806,679, filed Aug. 9, 2010, C. G. Liu, et al.
U.S. Appl. No. 12/924,211, filed Sep. 23, 2010, C. G. Liu, et al.
U.S. Appl. No. 13/199,713, filed Sep. 7, 2011, A. Zhamu, et al.
U.S. Appl. No. 11/800,728, filed May 8, 2007, A. Zhamu, et al.
U.S. Appl. No. 13/374,321, filed Dec. 21, 2011, A. Zhamu, et al.
U.S. Appl. No. 13/374,894, filed Jan. 23, 2012, A. Zhamu, et al.
B. Z. Jang, et al. "Graphene Surface-Enabled Lithium Ion-Exchanging Cells: Next-Generation High-Power Energy Storage Devices," Nano Letters, 11 (2011) 3785-3791.
J. T. Jang, et al, "Ultrathin Zirconium Disulfide Nanodiscs," J. Am. Chem. Soc. 2011, 133, 7636-7639.

* cited by examiner

*Primary Examiner* — Patrick Ryan
*Assistant Examiner* — Wyatt McConnell

(57) ABSTRACT

An inorganic material based surface-mediated cell (SMC) comprising (a) a cathode comprising a non-carbon-based inorganic cathode active material having a surface area to capture and store lithium thereon; (b) an anode comprising an anode current collector alone or both an anode current collector and an anode active material; (c) a porous separator; (d) a lithium-containing electrolyte in physical contact with the two electrodes, wherein the cathode has a specific surface area no less than 100 m²/g which is in direct physical contact with said electrolyte to receive lithium ions therefrom or to provide lithium ions thereto; and (e) a lithium source. This inorganic SMC provides both high energy density and high power density not achievable by supercapacitors and lithium-ion cells.

29 Claims, 11 Drawing Sheets

(A)

(B)

US 8,790,814 B2

INORGANIC NANO SHEET-ENABLED LITHIUM-EXCHANGING SURFACE-MEDIATED CELLS

The present invention is based on the research results of a US NSF SBIR project.

FIELD OF THE INVENTION

This invention relates generally to the field of electrochemical energy storage devices and, more particularly, to a totally new surface-mediated cell (SMC) that operates on the exchange of lithium ions between massive cathode surfaces and anode surfaces.

BACKGROUND OF THE INVENTION

Supercapacitors

Ultra-Capacitors or Electro-Chemical Capacitors

The high volumetric capacitance density of a supercapacitor derives from using porous electrodes to create a large surface area conducive to the formation of diffuse electric double layer (EDL) charges. The ionic species (cations and anions) in the EDL are formed in the electrolyte near an electrode surface (but not on the electrode surface per se) when voltage is imposed upon a symmetric supercapacitor (or EDLC), as schematically illustrated in FIG. 1(A). The required ions for this EDL mechanism pre-exist in the liquid electrolyte (randomly distributed in the electrolyte) when the cell is made or in a discharged state (FIG. 1(B)). These ions do not come from the opposite electrode material. In other words, the required ions to be formed into an EDL near the surface of a negative electrode (anode) active material (e.g., activated carbon particle) do not come from the positive electrode (cathode); i.e., they are not previously captured or stored in the surfaces or interiors of a cathode active material. Similarly, the required ions to be formed into an EDL near the surface of a cathode active material do not come from the surface or interior of an anode active material.

When the supercapacitor is re-charged, the ions (both cations and anions) already pre-existing in the liquid electrolyte are formed into EDLs near their respective local electrodes. There is no exchange of ions between an anode active material and a cathode active material. The amount of charges that can be stored (capacitance) is dictated solely by the concentrations of cations and anions that pre-exist in the electrolyte. These concentrations are typically very low and are limited by the solubility of a salt in a solvent, resulting in a low energy density.

In some supercapacitors, the stored energy is further augmented by pseudo-capacitance effects due to some electrochemical reactions (e.g., redox). In such a pseudo-capacitor, the ions involved in a redox pair also pre-exist in the electrolyte. Again, there is no exchange of ions between an anode surface and a cathode active material surface.

Since the formation of EDLs does not involve a chemical reaction or an exchange of ions between the two opposite electrodes, the charge or discharge process of an EDL supercapacitor can be very fast, typically in seconds, resulting in a very high power density (more typically 3,000-8,000 W/Kg). Compared with batteries, supercapacitors offer a higher power density, require no maintenance, offer a much higher cycle-life, require a very simple charging circuit, and are generally much safer. Physical, rather than chemical, energy storage is the key reason for their safe operation and extraordinarily high cycle-life.

Despite the positive attributes of supercapacitors, there are several technological barriers to widespread implementation of supercapacitors for various industrial applications. For instance, supercapacitors possess very low energy densities when compared to batteries (e.g., 5-8 Wh/kg for commercial supercapacitors vs. 20-30 Wh/Kg for the lead acid battery and 50-100 Wh/kg for the NiMH battery). Lithium-ion batteries possess a much higher energy density, typically in the range of 100-180 Wh/kg, based on the total cell weight.

Lithium-Ion Batteries (LIB):

Although possessing a much higher energy density, lithium-ion batteries deliver a very low power density (typically 100-500 W/Kg), requiring typically hours for re-charge. Conventional lithium-ion batteries also pose some safety concern.

The low power density or long re-charge time of a lithium ion battery is due to the mechanism of shuttling lithium ions between the interior of an anode and the interior of a cathode, which requires lithium ions to enter or intercalate into the bulk of anode active material particles during re-charge, and into the bulk of cathode active material particles during discharge. For instance, as illustrated in FIG. 1(C), in a most commonly used lithium-ion battery featuring graphite particles as an anode active material, lithium ions are required to diffuse into the inter-planar spaces of a graphite crystal at the anode during re-charge. Most of these lithium ions have to come all the way from the cathode side by diffusing out of the bulk of a cathode active particle, through the pores of a solid separator (pores being filled with a liquid electrolyte), and into the bulk of a graphite particle at the anode.

During discharge, lithium ions diffuse out of the anode active material (e.g. de-intercalate out of graphite particles 10 µm in diameter), migrate through the liquid electrolyte phase, and then diffuse into the bulk of complex cathode crystals (e.g. intercalate into particles lithium cobalt oxide, lithium iron phosphate, or other lithium insertion compound), as illustrated in FIG. 1(D). Because liquid electrolyte only reaches the external surface (not interior) of a solid particle (e.g. graphite particle), lithium ions swimming in the liquid electrolyte can only migrate (via fast liquid-state diffusion) to the surface of a graphite particle. To penetrate into the bulk of a solid graphite particle would require a slow solid-state diffusion (commonly referred to as "intercalation") of lithium ions. The diffusion coefficients of lithium in solid particles of lithium metal oxide are typically $10^{-16}$-$10^{-8}$ cm$^2$/sec (more typically $10^{-14}$-$10^{-10}$ cm$^2$/sec), and those of lithium in liquid are approximately $10^{-6}$ cm$^2$/sec.

In other words, these intercalation or solid-state diffusion processes require a long time to accomplish because solid-state diffusion (or diffusion inside a solid) is difficult and slow. This is why, for instance, the current lithium-ion battery for plug-in hybrid vehicles requires 2-7 hours of recharge time, as opposed to just seconds for supercapacitors. The above discussion suggests that an energy storage device that is capable of storing as much energy as in a battery and yet can be fully recharged in one or two minutes like a supercapacitor would be considered a revolutionary advancement in energy storage technology.

Lithium Ion Capacitors (LIC):

A hybrid energy storage device that is developed for the purpose of combining some features of an EDL supercapacitor (or symmetric supercapacitor) and those of a lithium-ion battery (LIB) is a lithium-ion capacitor (LIC). A LIC contains a lithium intercalation compound (e.g., graphite particles) as an anode and an EDL capacitor-type cathode (e.g. activated carbon, AC), as schematically illustrated in FIG. 1(E). In a commonly used LIC, $LiPF_6$ is used as an electrolyte salt, which is dissolved in a solvent, such as propylene carbonate. When the LIC is in a charged state, lithium ions are retained in the interior of the lithium intercalation compound anode (usually micron-scaled graphite particles) and their counter-ions (e.g. negatively charged $PF_6^-$) are disposed near activated carbon surfaces (but not on an AC surface, or captured by an AC surface), as illustrated in FIG. 1(E).

When the LIC is discharged, lithium ions migrate out from the interior of graphite particles (a slow solid-state diffusion process) to enter the electrolyte phase and, concurrently, the counter-ions $PF_6^-$ are also released from the EDL zone, moving further away from AC surfaces into the bulk of the electrolyte. In other words, both the cations ($Li^+$ ions) and the anions ($PF_6^-$) are randomly disposed in the liquid electrolyte, not associated with any electrode (FIG. 1(F)). This implies that, just like in a symmetric supercapacitor, the amounts of both the cations and the anions that dictate the specific capacitance of a LIC are essentially limited by the solubility limit of the lithium salt in a solvent (i.e. limited by the amount of $LiPF_6$ that can be dissolved in the solvent). Therefore, the energy density of LICs (a maximum of 14 WW/kg) is not much higher than that (6 WW/kg) of an EDLC (symmetric supercapacitor), and remains an order of magnitude lower than that (most typically 120-150 WW/kg) of a LIB.

Furthermore, due to the need to undergo de-intercalation and intercalation at the anode, the power density of a LIC is not high (typically <15 kW/kg, which is comparable to or only slightly higher than those of an EDLC).

The above review of the prior art indicates that a battery has a higher energy density, but is incapable of delivering a high power (high currents or pulse power) that an EV, HEV, or micro-EV needs for start-stop and accelerating. A battery alone is also not capable of capturing and storing the braking energy of a vehicle. A supercapacitor or LIC can deliver a higher power, but does not store much energy (the stored energy only lasts for a short duration of operating time) and, hence, cannot be a single power source alone to meet the energy/power needs of an EV or HEV.

More Recent Developments:

Most recently, our research group has invented a revolutionary class of high-power and high-energy-density energy storage devices now commonly referred to as the surface-mediated cell (SMC). This has been reported in the following patent applications and a scientific paper:

1. C. G. Liu, et al., "Lithium Super-battery with a Functionalized Nano Graphene Cathode," U.S. patent application Ser. No. 12/806,679 (Aug. 19, 2010).
2. C. G. Liu, et al, "Lithium Super-battery with a Functionalized Disordered Carbon Cathode," U.S. patent application Ser. No. 12/924,211 (Sep. 23, 2010).
3. Aruna Zhamu, C. G. Liu, David Neff, and Bor Z. Jang, "Surface-Controlled Lithium Ion Exchanging Energy Storage Device," U.S. patent application Ser. No. 12/928,927 (Dec. 23, 2010).
4. Aruna Zhamu, C. G. Liu, David Neff, Z. Yu, and Bor Z. Jang, "Partially and Fully Surface-Enabled Metal Ion-Exchanging Battery Device," U.S. patent application Ser. No. 12/930,294 (Jan. 3, 2011).
5. Aruna Zhamu, Chen-guang Liu, X. Q. Wang, and Bor Z. Jang, "Surface-Mediated Lithium Ion-Exchanging Energy Storage Device," U.S. patent application Ser. No. 13/199,450 (Aug. 30, 2011).
6. Aruna Zhamu, Chen-guang Liu, and Bor Z. Jang, "Partially Surface-Mediated Lithium Ion-Exchanging Cells and Method of Operating Same," U.S. patent application Ser. No. 13/199,713 (Sep. 7, 2011).
7. Bor Z. Jang, C. G. Liu, D. Neff, Z. Yu, Ming C. Wang, W. Xiong, and A. Zhamu, "Graphene Surface-Enabled Lithium Ion-Exchanging Cells: Next-Generation High-Power Energy Storage Devices," *Nano Letters*, 2011, 11 (9), pp 3785-3791.

There are two types of SMCs: partially surface-mediated cells (p-SMC, also referred to as lithium super-batteries) and fully surface-mediated cells (f-SMC). Both types of SMCs contain the following components:

(a) An anode containing an anode current collector (such as copper foil) in a lithium super-battery or p-SMC, or an anode current collector plus an anode active material in an f-SMC. The anode active material in an f-SMC is preferably a nano-carbon material (e.g., graphene) having a high specific surface area (preferably >100 $m^2/g$, more preferably >500 $m^2/g$, further preferably >1,000 $m^2/g$, and most preferably >1,500 $m^2/g$). The anode current collector is preferably porous, having large surface areas to accommodate returning lithium ions when the cell is being re-charged;

(b) A cathode containing a cathode current collector and a cathode active material (e.g. graphene or disordered carbon) having a high specific surface area (preferably >100 $m^2/g$, more preferably >500 $m^2/g$, further preferably >1,000 $m^2/g$, still more preferably >1,500 $m^2/g$, and most preferably >2,000 $m^2/g$);

(c) A porous separator separating the anode and the cathode, soaked with an electrolyte (preferably liquid or gel electrolyte); and (d) A lithium source disposed in an anode or a cathode (or both) and in direct contact with the electrolyte.

In a fully surface-mediated cell, f-SMC, as illustrated in FIG. 2, both the cathode active material and the anode active material are porous, having large amounts of graphene surfaces in direct contact with liquid electrolyte. These electrolyte-wetted surfaces are ready to interact with nearby lithium ions dissolved therein, enabling fast and direct adsorption of lithium ions on graphene surfaces and/or redox reaction between lithium ions and surface functional groups, thereby removing the need for solid-state diffusion or intercalation. When the SMC cell is made, particles or foil of lithium metal are implemented at the anode (FIG. 2A), which are ionized during the first discharge cycle, supplying a large amount of lithium ions. These ions migrate to the nano-structured cathode through liquid electrolyte, entering the pores and reaching the surfaces in the interior of the cathode without having to undergo solid-state intercalation (FIG. 2B). When the cell is re-charged, a massive flux of lithium ions are quickly released from the large amounts of cathode surfaces, migrating into the anode zone. The large surface areas of the nano-structured anode enable concurrent and high-rate deposition of lithium ions (FIG. 2C), re-establishing an electrochemical potential difference between the lithium-decorated anode and the cathode.

A particularly useful nano-structured electrode material is nano graphene platelet (NGP), which refers to either a single-layer graphene sheet or multi-layer graphene pletelets. A single-layer graphene sheet is a 2-D hexagon lattice of carbon atoms covalently bonded along two plane directions. We have studied a broad array of graphene materials for electrode uses: pristine graphene, graphene oxide, chemically or thermally reduced graphene oxide, graphene fluoride, chemically modified graphene, hydrogenated graphene, nitrogenated graphene, doped graphene. In all cases, both single-layer and multi-layer graphene materials were prepared from natural graphite, petroleum or coal tar pitch-derived artificial graphite, other types of artificial graphite, micron-scaled graphite fibers, activated carbon (AC), and treated carbon black (t-CB). AC and CB contain narrower graphene sheets or aromatic rings as a building block, while graphite and graphite fibers contain wider graphene sheets. Their micro-structures all have to be exfoliated (to increase inter-graphene spacing in graphite) or activated (to open up nano gates or pores in t-CB) to allow liquid electrolyte to access more graphene edges and surfaces where lithium can be captured. Other types of disordered carbon studied have included soft carbon (including meso-phase carbon, such as meso-carbon micro-beads), hard carbon (including petroleum coke), and amorphous carbon, in addition to carbon black and activated carbon. All these carbon/graphite materials have graphene sheets dispersed in their microstructure.

These highly conducting materials, when used as a cathode active material, can have a functional group that is capable of rapidly and reversibly forming a redox reaction with lithium ions. This is one possible way of capturing and storing lithium directly on a graphene surface (including edge). We have also discovered that the benzene ring centers of graphene sheets are highly effective and stable sites for capturing and storing lithium atoms, even in the absence of a lithium-capturing functional group.

Similarly, in a lithium super-battery or partially surface-mediated cell (p-SMC), the cathode includes a chemically functionalized NGP or a functionalized disordered carbon material having certain specific functional groups capable of reversibly and rapidly forming/releasing a redox pair with a lithium ion during the discharge and charge cycles of a p-SMC. In a p-SMC, the disordered carbon or NGP is used in the cathode (not the anode) of the lithium super-battery. In this cathode, lithium ions in the liquid electrolyte only have to migrate to the edges or surfaces of graphene sheets (in the case of functionalized NGP cathode), or the edges/surfaces of the aromatic ring structures (small graphene sheets) in a disordered carbon matrix. No solid-state diffusion is required at the cathode. The presence of a functionalized graphene or carbon having functional groups thereon enables reversible storage of lithium on the surfaces (including edges), not the bulk, of the cathode material. Such a cathode material provides one type of lithium-storing or lithium-capturing surface. Again, another possible mechanism is based on the benzene ring centers of graphene sheets that are highly effective and stable sites for capturing and storing lithium atoms.

In a p-SMC, the anode comprises a current collector and a lithium foil alone (as a lithium source), without an anode active material to capture and store lithium ions/atoms. Lithium has to deposit onto the front surface of an anode current collector alone (e.g. copper foil) when the battery is re-charged. Since the specific surface area of a current collector is very low (typically <1 m²/gram), the over-all lithium re-deposition rate can be relatively low as compared to f-SMC.

The features and advantages of SMCs that differentiate the SMC from conventional lithium-ion batteries (LIB), supercapacitors, and lithium-ion capacitors (LIC) are summarized below:

(A) In an SMC, lithium ions are exchanged between anode surfaces and cathode surfaces, not bulk or interior of an electrode active material:
  a. The conventional LIB stores lithium in the interior of an anode active material (e.g. graphite particles) in a charged state (e.g. FIG. 1(C)) and the interior of a cathode active material in a discharged state (FIG. 1(D)). During the discharge and charge cycles of a LIB, lithium ions must diffuse into and out of the bulk of a cathode active material, such as lithium cobalt oxide ($LiCoO_2$) and lithium iron phosphate ($LiFePO_4$). Lithium ions must also diffuse in and out of the inter-planar spaces in a graphite crystal serving as an anode active material. The lithium insertion or extraction procedures at both the cathode and the anode are very slow, resulting in a low power density and requiring a long re-charge time.
  b. When in a charged state, a LIC also stores lithium in the interior of graphite anode particles (FIG. 1(E)), thus requiring a long re-charge time as well. During discharge, lithium ions must also diffuse out of the interior of graphite particles, thereby compromising the power density. The lithium ions (cations $Li^+$) and their counter-ions (e.g. anions $PF_6^-$) are randomly dispersed in the liquid electrolyte when the LIC is in a discharged state (FIG. 1(F)). In contrast, the lithium ions are captured by graphene surfaces (e.g. at centers of benzene rings of a graphene sheet as illustrated in FIG. 2(D)) when an SMC is in a discharged state. Lithium is deposited on the surface of an anode (anode current collector and/or anode active material) when the SMC is in a charged state. Relatively few lithium ions stay in the liquid electrolyte.
  c. When in a charged state, a symmetric supercapacitor (EDLC) stores their cations near a surface (but not at the surface) of an anode active material (e.g. activated carbon, AC) and stores their counter-ions near a surface (but not at the surface) of a cathode active material (e.g., AC), as illustrated in FIG. 1(A). When the EDLC is discharged, both the cations and their counter-ions are re-dispersed randomly in the liquid electrolyte, further away from the AC surfaces (FIG. 1(B)). In other words, neither the cations nor the anions are exchanged between the anode surface and the cathode surface.
  d. For a supercapacitor exhibiting a pseudo-capacitance or redox effect, either the cation or the anion form a redox pair with an electrode active material (e.g. polyanniline or manganese oxide coated on AC surfaces) when the supercapacitor is in a charged state. However, when the supercapacitor is discharged, both the cations and their counter-ions are re-dispersed randomly in the liquid electrolyte, away from the AC surfaces. Neither the cations nor the anions are exchanged between the anode surface and the cathode surface. In contrast, in a SMC, the cations ($Li^+$) are captured by cathode surfaces (e.g. graphene benzene ring centers) when the SMC is in the discharged state. It is also the cations ($Li^+$) that are captured by surfaces of an anode current collector and/or anode active material) when the SMC is in the discharged state. In other words, the lithium ions are shuttled between the anode surfaces and the cathode surfaces.
  e. An SMC operates on the exchange of lithium ions between the surfaces of an anode (anode current collector and/or anode active material) and a cathode (cathode active material). The cathode in a SMC has (a) benzene ring centers on a graphene plane to capture and release lithium; (b) functional groups (e.g. attached at the edge or basal plane surfaces of a graphene sheet) that readily and reversibly form a redox reaction with a lithium ion from a lithium-containing electrolyte; and (c) surface defects to trap and release lithium during discharge and charge. Unless the cathode active material (e.g. graphene, CNT, or disordered carbon) is heavily functionalized, mechanism (b) does not significantly contribute to the lithium storage capacity.

When the SMC is discharged, lithium ions are released from the surfaces of an anode (surfaces of an anode current collector and/or surfaces of an anode active material, such as graphene). These lithium ions do not get randomly dispersed in the electrolyte. Instead, these lithium ions swim through liquid electrolyte and get captured by the surfaces of a cathode active material. These lithium ions are stored at the benzene ring centers, trapped at surface defects, or captured by surface/edge-borne functional groups. Very few lithium ions remain in the liquid electrolyte phase.

When the SMC is re-charged, massive lithium ions are released from the surfaces of a cathode active material having a high specific surface area. Under the influence of an electric field generated by an outside battery charger, lithium ions are driven to swim through liquid electrolyte and get captured by anode surfaces, or are simply electrochemically plated onto anode surfaces.

(B) In a discharged state of a SMC, a great amount of lithium atoms are captured on the massive surfaces of a cathode active material. These lithium ions in a discharged SMC are not dispersed or dissolved in the liquid electrolyte, and are not part of the electrolyte. Therefore, the solubility limit of lithium ions and/or their counter-ions does not become a limiting factor for the amount of lithium that can be captured at the cathode side. It is the specific surface area at the cathode that dictates the lithium storage capacity of an SMC provided there is a correspondingly large amount of available lithium atoms at the lithium source prior to the first discharge/charge.

(C) During the discharge of an SMC, lithium ions coming from the anode side through a separator only have to diffuse in the liquid electrolyte residing in the cathode to reach a surface/edge of a graphene plane. These lithium ions do not need to diffuse into or out of the volume (interior) of a solid particle. Since no diffusion-limited intercalation is involved at the cathode, this process is fast and can occur in seconds. Hence, this is a totally new class of energy storage device that exhibits unparalleled and unprecedented combined performance of an exceptional power density, high energy density, long and stable cycle life, and wide operating temperature range. This device has exceeded the best of both battery and supercapacitor worlds.

(D) In an f-SMC, the energy storage device operates on lithium ion exchange between the cathode and the anode. Both the cathode and the anode (not just the cathode) have a lithium-capturing or lithium-storing surface and both electrodes (not just the cathode) obviate the need to engage in solid-state diffusion. Both the anode and the cathode have large amounts of surface areas to allow lithium ions to deposit thereon simultaneously, enabling dramatically higher charge and discharge rates and higher power densities.

The uniform dispersion of these surfaces of a nano-structured material (e.g. graphene, CNT, disordered carbon, nano-wire, and nano-fiber) at the anode also provides a more uniform electric field in the electrode in which lithium can more uniformly deposit without forming a dendrite. Such a nano-structure eliminates the potential formation of dendrites, which was the most serious problem in conventional lithium metal batteries (commonly used in 1980s and early 1990s before being replaced by lithium-ion batteries).

(E) A SMC typically has an open-circuit voltage of >1.0 volts (most typically >1.5 volts) and can operate up to 4.5 volts for lithium salt-based organic electrolyte. Using an identical electrolyte, a corresponding EDLC or symmetric supercapacitor has an open-circuit voltage of essentially 0 volts and can only operate up to 2.7 volts. Also using an identical electrolyte, a LIC operates between 2.2 volts and 3.8 volts. These are additional manifestations of the notion that the SMC is fundamentally different and patently distinct from both an EDLC and a LIC.

The amount of lithium stored in the lithium source when a SMC is made dictates the amount of lithium ions that can be exchanged between an anode and a cathode. This, in turn, dictates the energy density of the SMC.

All of these earlier SMC cells were based on highly conducting nano carbon materials (e.g. graphene) as a cathode active material. Upon further studies, we have made several significant yet unexpected discoveries:

(1) First, we have observed that a SMC can be made from a non-carbon, inorganic cathode material, such as bismuth selenide or bismuth telluride; transition metal dichalcogenide or trichalcogenide; sulfide (including mono-, di-, and poly-sulfide), selenide (including mono-, di-, and poly-selenide), or telluride (including mono-, di-, and poly-sulfide) of niobium, zirconium, molybdenum, hafnium, tantalum, tungsten, a transition metal; and boron nitride. This is quite surprising in view of the understanding that these inorganic materials are actually electrically insulating and would have been considered by a person of ordinary or extraordinary in the art as not conducive to delivering a high power density.

(2) Further, although it has been proposed that zirconium disulfide ($ZrS_2$) nano discs can be used as an anode active material in a lithium-ion battery [J. T. Jang, et al, "Ultrathin Zirconium Disulfide Nanodiscs," J. Am. Chem. Soc. 2011, 133, 7636-7639], there has been no report or suggestion on the use of $ZrS_2$ as a cathode active material in a SMC cell. There is no prior art teaching about using BN nano sheets or $ZrS_2$ nano discs as a cathode active material for any electrochemical cell.

(3) There has been no prior knowledge that surfaces of these inorganic materials, when exfoliated and isolated into a nano disc, nano platelet, or nano sheet form, could capture lithium ions from electrolyte and store lithium thereon. We have surprisingly observed that by implementing these nano structures as a cathode active material in a SMC configuration (as opposed to an anode active material in a Li-ion cell), these materials exhibit a dramatically higher electrode specific capacity and higher energy density.

(4) We have further discovered that these inorganic material cathode-based SMCs provide exceptionally high power density values that could not be achieved by the corresponding Li-ion cells containing the same inorganic material as an anode active material.

SUMMARY OF THE INVENTION

The present invention provides an inorganic material surface-mediated, lithium ion-exchanging cell (SMC) comprising:

(a) A positive electrode (cathode) comprising a non-carbon-based cathode active material having a surface area to capture and store lithium thereon;
(b) A negative electrode (anode) comprising an anode current collector alone (FIG. 3(A), containing no anode active material) or both an anode current collector and an anode active material having a surface area to capture or store lithium thereon (FIG. 3(B));
(c) A porous separator disposed between the anode and the cathode;
(d) A lithium-containing electrolyte in physical contact with the two electrodes, wherein the cathode has a specific surface area no less than 100 m$^2$/g which is in direct physical contact with the electrolyte to receive lithium ions therefrom or to provide lithium ions thereto (preferably the anode also has a specific surface area >100 m$^2$/g); and
(e) A lithium source disposed in at least one of the two electrodes or pre-lithiated into or onto the anode when the cell is made.

In a preferred embodiment, the non-carbon-based cathode active material contains nano discs, nano platelets, or nano sheets of an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, nickel, manganese, or any transition metal; (d) boron nitride, or (e) a combination thereof; wherein the discs, platelets, or sheets have a thickness less than 100 nm. Preferably, the non-carbon-based cathode active material has a specific surface area no less than 200 m$^2$/g which is in direct physical contact with the electrolyte, or the discs, platelets, or sheets have a thickness less than 20 nm. Further preferably, the non-carbon-based cathode active material has a specific surface area no less than 500 m$^2$/g which is in direct physical contact with the electrolyte, or the discs, platelets, or sheets have a thickness less than 10 nm. The cathode active material may contain a single-layer boron nitride sheet, or a zirconium disilfide nano disc having a thickness less than 100 nm (preferably less than 20 nm, more preferably less than 10 nm).

In an actual practice, the cathode preferably further contains a conductive additive, and the cathode forms a meso-porous structure having a pore size in the range of 2 nm and 50 nm. Preferably, the cathode further contains a resin binder that bonds the discs, platelets, or sheets together, and bonds them to a current collector. The conductive filler may be selected from graphite or carbon particles, carbon black, expanded graphite, graphene, carbon nanotube, carbon nanofiber, carbon fiber, conductive polymer, or a combination thereof.

The lithium source may be preferably in a form of solid lithium or lithium alloy foil, lithium or lithium alloy chip, lithium or lithium alloy powder, or surface-stabilized lithium particles. The lithium source may be a layer of lithium or lithium alloy thin film pre-loaded on surfaces of an anode active material.

In one preferred embodiment, the cell operates between a lower voltage limit and an upper voltage limit wherein the lithium source provides an amount of lithium sufficient for the anode to retain a non-zero lithium content when the cell is discharged to the lower voltage limit. Such a strategy unexpectedly results in a cell with a higher energy density.

The electrolyte preferably comprises lithium salt-containing liquid electrolyte (e.g. organic liquid or ionic liquid) or gel electrolyte in which lithium ions have a high diffusion coefficient. Solid electrolyte is normally not desirable, but some thin layer of solid electrolyte may be used if it exhibits a relatively high diffusion rate. Lithium-containing ionic liquids are particularly desired due to their low volatility and non-flammability (hence, low or no fire or explosion hazard).

To illustrate the operational principle of this new battery device (FIG. 4(A)), one may consider a case wherein a lithium source (e.g. small pieces of lithium foil) is implemented between a nano-structured anode (e.g. comprising graphene sheets) and a porous polymer separator when the battery device is made, and wherein a nano-structured cathode comprises nano-structured inorganic material having massive surface areas capable of capturing and storing lithium thereon. The inorganic cathode contains pores that are preferably meso-scaled (2 nm-50 nm), but can be smaller than 2 nm. Referring to FIG. 4(A)-(C), during the first discharge cycle, lithium foil is ionized to generate lithium ions in the liquid electrolyte. Lithium ions rapidly migrate through the pores of the polymer separator into the cathode side. Since the cathode is also meso-porous having interconnected pores to accommodate liquid electrolyte therein, lithium ions basically just have to sail through liquid to reach an active site on a surface or edge of an inorganic nano sheet, platelet, or disc at the cathode. The inorganic surface is in direct contact with electrolyte and readily accepts lithium ions from the electrolyte. Because all the steps (lithium ionization, liquid phase diffusion, and surface trapping/adsoption/capturing) are fast and no solid-state diffusion is required, the whole process is very fast, enabling fast discharging of the SMC and a high power density.

This is in stark contrast to the conventional lithium-ion battery wherein lithium ions are required to diffuse into the bulk of a solid cathode particle (e.g., micron-sized lithium cobalt oxide) during discharge, which is a very slow process. During discharge of the lithium-ion battery, these lithium ions have to come out of the bulk of graphite particles at the anode. Since liquid electrolyte only reaches the surfaces of these micron-scaled graphite particles (not in direct contact with the graphene surfaces inside the graphite particle), lithium has to undergo solid-state diffusion, and this lithium de-intercalation step is also very slow.

In the above example, the discharge process continues until either the lithium foil is completely ionized or all the active sites on the cathode active materials are occupied by lithium atoms. In one preferred embodiment, the amount of lithium source is sufficiently large to ensure that there is non-zero amount of lithium left with the anode. Preferably, this amount is at least 30% of the total weight of the anode (including the anode current collector and anode active materials combined).

During re-charge, lithium ions are released from the massive surfaces of the cathode active material, diffuse through liquid electrolyte, and get captured by the surfaces of an anode current collector or anode active material (e.g. simply get electrochemically deposited on a surface of the nano-structured anode material). Again, no solid-state diffusion is required and, hence, the whole process is very fast, requiring a short re-charge time. This is as opposed to the required solid-state diffusion of lithium ions into the bulk of graphite particles at the anode of a conventional lithium-ion battery.

The surfaces of an SMC cathode material are capable of capturing lithium ions directly from a liquid electrolyte phase and storing lithium atoms on the surfaces in a reversible and stable manner. This is a completely new electrochemistry that has never been discovered by anybody than our research group. During the SMC discharge process, lithium ions are released from the anode and the inorganic surfaces at the cathode continue to extract or capture lithium ions from the liquid electrolyte, always maintaining a low lithium ion content in the liquid electrolyte, lower or equal to the lithium ion solubility limit in the liquid. This process continues until inorganic surfaces at the cathode are saturated with lithium. This saturation limit can be many times greater than the lithium ion solubility limit in the liquid electrolyte provided the specific surface area of the cathode active material is sufficiently high (e.g. higher than 100 $m^2/g$). Such a high lithium amount on cathode surfaces implies a high energy density, and also a high power density since this large amount of lithium is captured in a very short period of time. We have achieved an energy density that is >>30 times higher than that of a supercapacitor. The amount of electric double layer charges in a supercapacitor is limited by the solubility of ionic species in the liquid electrolyte. Our SMC strategy has essentially removed this limitation and defied the expectations of all electrochemists.

Clearly, the presently invented battery device provides a very unique platform of exchanging lithium ions between the massive surfaces of an anode and the massive surfaces of a cathode that requires no solid-state diffusion in both electrodes. The process is substantially dictated by the surface-capturing of lithium, plus the liquid-phase diffusion (all being very fast). Hence, the device is herein referred to as a surface-mediated, lithium ion-exchanging battery. This is a totally different and patently distinct class of energy storage device than the conventional lithium-ion battery, wherein solid-state diffusion of lithium (intercalation and de-intercalation) is required at both the anode and the cathode during both the charge and discharge cycles.

This new surface-mediated, lithium ion-exchanging battery device is also patently distinct from the conventional supercapacitor based on the electric double layer (EDL) mechanism or pseudo-capacitance mechanism. In both mechanisms, no lithium ions are exchanged between the two electrodes (since lithium is not stored in the bulk or surfaces of the electrode; instead, they are stored in the electric double layers near the electrode surfaces). When a supercapacitor is re-charged, the electric double layers are formed near the activated carbon surfaces at both the anode and the cathode sides. When the supercapacitor is discharged, both the negatively charged species and the positively charged species get randomly dispersed in the electrolyte (staying further away from electrode material surfaces). In contrast, when a SMC is re-charged, essentially all of the lithium ions are electro-plated onto the surfaces of the anode, and the cathode side is essentially lithium-free. When the SMC is discharged, essentially all the lithium ions are captured by the cathode active material surfaces. Very little lithium stays in the electrolyte.

More significantly, all the prior art supercapacitors do not contain an extra lithium source and do not involve ionization of lithium from this lithium source. The charge storage capacitance of a supercapacitor (even when using a Li-containing electrolyte) is limited by the amounts of cations and anions that participate in the formation of EDL charges. These amounts are dictated by the original concentration of $Li^+$ ions and their counter ions (anions) from a lithium salt, which are in turn dictated by the solubility limits of these ions in the electrolyte solvent. To illustrate this point, let us assume that only up to 1 mole of $Li^+$ ions can be dissolved in 1 mL of a solvent and there are totally 5 mL of solvent added to a particular supercapacitor cell, Then, there is a maximum of 5 moles of $Li^+$ ions that can be present in the total cell and this amount dictates the maximum amount of charges that can be stored in this supercapacitor.

In contrast (and quite surprisingly), the amounts of lithium ions that can be shuttled between the anode surface and the cathode surface of a SMC are not limited by the chemical solubility of lithium salt in this same solvent. Assume that an identical 5 mL of solvent (containing 5 moles of $Li^+$ ions, as described above for a supercapacitor) is used in the SMC. Since the solvent is already fully saturated with the lithium salt, one would expect that this solvent cannot and will not accept any more $Li^+$ ions from an extra lithium source (5 moles being the maximum). Consequently, one would expect that these 5 moles of $Li^+$ ions are the maximum amount of lithium that we can use to store charges (i.e., the maximum amount of $Li^+$ ions that can be captured by the cathode during discharge, or the maximum amount of $Li^+$ ions that can be captured by the anode during re-charge). Contrary to this expectation by a person of ordinary or even extra-ordinary skill in the art of electrochemistry, we have surprisingly discovered that the amount of $Li^+$ ions that can be captured by the surfaces of either electrode (or, the amount of $Li^+$ ions that can be shuttled between the two electrodes) in a SMC typically far exceeds this solubility limit by 1 or 2 orders of magnitude. The implementation of a lithium source at the anode and massive lithium-capturing surfaces at the cathode appears to have defied this expectation by providing dramatically more lithium ions than what the solvent can dissolve therein.

Further surprisingly, in a SMC, the amount of lithium capable of contributing to the charge storage is controlled (limited) by the amount of surface active sites of a cathode capable of capturing lithium ions from the electrolyte. This is so even when this amount of surface active sites far exceeds the amount of $Li^+$ ions that the solvent can hold at one time (e.g. 5 moles in the present discussion), provided that the implemented lithium source can provide the extra amount lithium ions. Also quite unexpectedly, lithium atoms appear to be capable of strongly and reversibly bonding to the individual centers of hexagons of B and N atoms that constitute a BN nano sheet.

The cathode active material has a high specific surface area (>100 $m^2/g$) that is in direct contact with the electrolyte (e.g. being directly immersed in electrolyte) and capable of capturing lithium ions from the electrolyte and storing the lithium atoms in the surface active sites. Preferably, both of the two electrodes have a high specific surface area (>100 $m^2/g$) that is in direct contact with the electrolyte and capable of capturing/storing lithium atoms/ions in their surface active sites. Preferably, at least one of the two electrodes has a nano-structured material having a high specific surface area no less than 500 $m^2/gram$ (preferably >1,000 $m^2/gram$, and more preferably >1,500 $m^2/gram$) to store or support lithium ions or atoms thereon.

Preferably, the lithium source comprises a lithium or lithium alloy chip, lithium or lithium alloy foil, lithium or lithium alloy powder, surface-passivated or stabilized lithium particles, or a combination thereof. The lithium source may be implemented at the anode side before the first discharge procedure is carried out on this battery device. Alternatively, the lithium source may be implemented at the cathode side before the first charge procedure is carried out on this battery device. As another alternative, both the cathode and the anode may be fabricated to contain some lithium source during the battery manufacturing process. It is important to note that this solid lithium source provides the majority of the lithium ions that are to be exchanged between the anode surfaces and the cathode surfaces during the charge-discharge cycles. Although the lithium-containing electrolyte naturally provides some of the needed lithium ions, this amount is way too short to enable the battery device to deliver a high energy density. This is why any symmetric supercapacitor, even if containing Li-based electrolyte, does not exhibit a high energy density.

In the presently invented SMC cell, the anode active material is preferably selected from the following: (a) A porous disordered carbon material selected from a soft carbon, hard carbon, polymeric carbon or carbonized resin, meso-phase carbon, coke, carbonized pitch, carbon black, activated carbon, or partially graphitized carbon; (b) A graphene material selected from a single-layer sheet or multi-layer platelet of graphene, graphene oxide (preferably having less than 5% by weight oxygen), graphene fluoride, hydrogenated graphene, nitrogenated graphene, boron-doped graphene, nitrogen-doped graphene, or chemically or thermally reduced graphene oxide; (c) Exfoliated graphite; (d) Meso-porous carbon (e.g. obtained by template-assisted synthesis or chemical activation of meso-phase carbon); (e) A carbon nanotube selected from a single-walled carbon nanotube or multi-walled carbon nanotube; (f) A carbon nano-fiber, (g) A carbon gel or carbon foam material, or (f) A combination thereof. Although CNTs are not preferred nano-structured materials due to the high costs and other technical issues, CNTs (alone or in combination with another nano-structured material) can still be used in the anode of the presently invented surface-controlled lithium ion-exchanging battery.

The disordered carbon material may be formed of two phases with a first phase being graphite crystals or stacks of graphene planes and a second phase being non-crystalline carbon and wherein the first phase is dispersed in the second phase or bonded by the second phase. The disordered carbon material may contain less than 90% by volume of graphite crystals and at least 10% by volume of non-crystalline carbon.

In a preferred embodiment, at least one of the anode current collector or cathode current collector is a porous, electrically conductive material selected from metal foam, metal web or screen, perforated metal sheet, metal fiber mat, metal nanowire mat, porous conductive polymer film, conductive polymer nano-fiber mat or paper, conductive polymer foam, carbon foam, carbon aerogel, carbon xerox gel, graphene foam, graphene oxide foam, reduced graphene oxide foam, carbon fiber paper, graphene paper, graphene oxide paper, reduced graphene oxide paper, carbon nano-fiber paper, carbon nano-tube paper, or a combination thereof.

The lithium source may be selected from lithium metal (e.g., in a thin foil or powder form, preferably stabilized or surface-passivated), a lithium metal alloy, a mixture of lithium metal or lithium alloy with a lithium intercalation compound, a lithiated compound, lithiated titanium dioxide, lithium titanate, lithium manganate, a lithium transition metal oxide, $Li_4Ti_5O_{12}$, or a combination thereof. Specifically, the lithium intercalation compound or lithiated compound may be selected from the following groups of materials: (a) Lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Lithiated alloys or intermetallic compounds of Si, Ge, Sn, Pb, Sb, Bi, Zn, Al, Ti, Co, Ni, Mn, Cd, and their mixtures; (c) Lithiated oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof, and (d) Lithiated salts or hydroxides of Sn.

The electrolyte may be preferably selected from any of the electrolytes used in conventional lithium ion batteries or lithium metal batteries. The electrolyte is preferably liquid electrolyte or gel electrolyte. The electrolyte may comprise a lithium salt-doped ionic liquid. In the SMC, the positive electrode preferably has a thickness greater than 5 µm, preferably greater than 10 µm, further preferably greater than 50 µm, and most preferably greater than 100 µm.

In a preferred embodiment, in the SMC, at least 50% (more preferably at least 80%) of the lithium is stored on surfaces of the anode active material (lithium being in direct physical contact with anode surfaces) when the device is in a charged state, or at least 50% (more preferably at least 80%) of the lithium is stored on surfaces of the cathode active material (lithium being in direct physical contact with cathode surfaces) when the device is in a discharged state.

The SMC typically operates in a voltage range of from 1.0 volts to 4.5 volts, but can be prescribed to operate in a range between a lower voltage limit (LVL) and an upper voltage limit (UVL, from 3.8 to 4.5 volts). The LVL is preferably between 0.6 volts and 2.0 volts, but more preferably between 0.8 volts and 1.5 volts. The LVL is preferably lower than the open-circuit voltage (OCV) of the SMC that is measured when the cell is made. The OCV of a SMC can be greater than 2.0 volts or even greater than 2.5 volts.

It may be noted that a symmetric supercapacitor featuring an organic electrolyte has an OCV of 0 volts and can only operate up to 2.7 volts. In contrast, a SMC using exactly the same organic electrolyte typically operates from 0.6 volts (more typically 1.2 volts) to 4.5 volts. This is another piece of evidence that the SMC and the supercapacitor are two fundamentally distinct classes of energy storage devices, operating on different mechanisms and principles.

Quite surprisingly, the inorganic cathode-based SMC device provides an energy density typically in the range of 100-200 Wh/kg based on the total cell weight, and a maximum power density as high as 100 Kw/kg, also based on the total cell weight. This power density is more than 1 order of magnitude higher than the power densities (3-8 Kw/kg) of conventional supercapacitors, which are noted for their high power density.

DESCRIPTION OF THE PREFERRED EMBODIMENTS

Figure 1A:
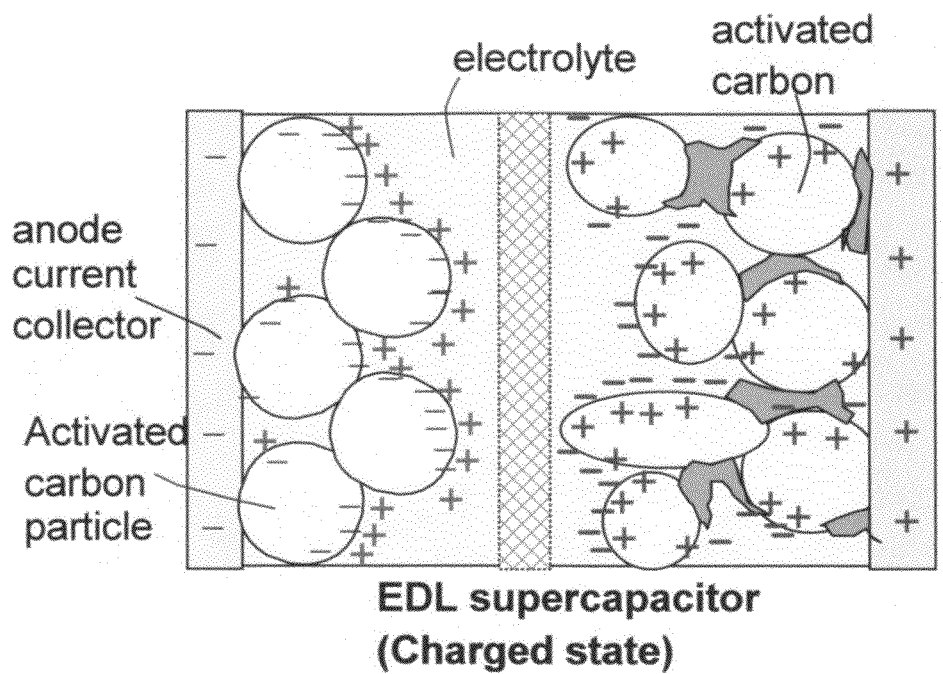
FIG. 1 (A) a prior art electric double-layer (EDL) supercapacitor in the charged state; (B) the same EDL supercapacitor in the discharged state; (C) a prior art lithium-ion battery (LIB) cell in the charged state; (D) the same LIB in the discharged state; (E) a prior art lithium-ion capacitor (LIC) cell in the charged state, using graphite particles as the anode active material and activated carbon (AC) as the cathode active material; (F) the same LIC in the discharged state; (G) another prior art LIC using lithium titanate as the anode active material and AC as the cathode active material.

The present invention may be more readily understood by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting the claimed invention.

This invention provides an electrochemical energy storage device that is herein referred to as a surface-mediated, lithium ion-exchanging cell (or simply surface-mediated cell, SMC). This SMC device exhibits a power density significantly higher than the power densities of conventional supercapacitors and dramatically higher than those of conventional lithium ion batteries. This device exhibits an energy density comparable to or higher than those of batteries, and significantly higher than those of conventional supercapacitors.

This surface-mediated, ion-exchanging battery contains a positive electrode containing a non-carbon nano material having a lithium-storing or lithium-capturing surface. The non-carbon material electrode is preferably nano-structured with meso-scaled pores (2-50 nm, preferably 2-10 nm) and great amounts of surface areas (preferably >20 $m^2/g$, more preferably >100 $m^2/g$, further more preferably >500 $m^2/g$, and most preferably >1,000 m2/g) in physical contact with electrolytes. The inorganic surfaces alone, without any surface-borne functional groups, are capable of capturing and storing lithium thereon.

A wide range of inorganic materials can be used as a cathode active material. These include those layered materials that can be formed into a thin disc, platelet, or sheet form (having a thickness <100 nm, preferably <20 nm), exhibiting a high specific surface area In a preferred embodiment, the non-carbon-based cathode active material contains nano discs, nano platelets, or nano sheets of an inorganic material selected from: (a) bismuth selenide or bismuth telluride, (b) transition metal dichalcogenide and trichalcogenide (e.g. $TiS_3$), (c) sulfide, selenide, or telluride of niobium, zirconium, molybdenum, hafnium, tantalum, tungsten, titanium, vanadium, or a transition metal; (d) boron nitride, or (e) a combination thereof; wherein the discs, platelets, or sheets have a thickness less than 100 nm.

Other useful layered inorganic materials include layered transition metal oxides, such as $LiCoO_2$, $V_2O_5$, $V_6O_{13}$, $LiV_3O_8$, $LiNi_{1-y}Co_yO_2$, $LiNi_yMn_yCo_{1-2y}O_2$, $MnO_2$, $CoO_2$, $NiO_2$, and $MoO_3$. By dispersing powder of these materials in a low surface tension solvent or water (with a surfactant) and subjecting the resulting suspension to a high-intensity ultra-sonicator, one can produce nano platelets of these transition metal oxide materials or their lithiated versions.

It has been commonly believed that a high specific surface area is an undesirable feature of cathodes (particularly transition metal oxide cathodes) for lithium-ion cells based on the belief that a high surface area leads to the formation of more solid-electrolyte interface (SEI), a common cause of capacity irreversibility or capacity loss. We have herein defied this expectation and discovered that these inorganic cathode materials (when formed into a thin nano disc, nano platelet, or nano sheet form) can be superior cathode materials for SMCs, which could operate tens of thousands of cycles without any significant capacity decay. Even more surprisingly, these inorganic nano materials, when incorporated as a cathode active material in a SMC and when the specific surface area of the resulting cathode exceeds 100 $m^2/g$, exhibit a specific capacity significantly higher than that of a corresponding bulk material used as a lithium-ion battery cathode. For instance, the micron-sized layered $CoO_2$ used in a lithium-ion battery exhibits a specific capacity typically lower than 160 mAh/g. In contrast, the same material produced in a nano platelet form and used as an SMC cathode delivers a specific capacity as high as >360 mAh/g. This is well beyond the expectation of skilled artisans in the field of electrochemistry.

In an embodiment of the present invention, one may choose to add a conductive additive and/or a binder material (e.g. binder resin or carbonized resin) to form an electrode of structural integrity. A conductive additive is generally needed since the inorganic materials (e.g., BN, $ZrS_2$, etc) are not electrically conducting. The conductive additive or filler may be selected from any electrically conductive material, but is advantageously selected from graphite or carbon particles, carbon black, expanded graphite, graphene, carbon nanotube, carbon nano-fiber, carbon fiber, conductive polymer, or a combination thereof. The amount of conductive fillers is preferably no greater than 30% by weight based on the total cathode electrode weight (without counting the cathode current collector weight), preferably no greater than 15% by weight, and most preferably no greater than 10% by weight. The amount of binder material is preferably no greater than 15% by weight, more preferably no greater than 10%, and most preferably no greater than 5% by weight. It is important to note that the inorganic nano material, with or without the conductive filler and binder, must form an electrode having a specific surface area greater than 100 m2/g. The high specific surface area of an inorganic cathode active material per se may not be sufficient; the resulting cathode must form a meso-porous structure having a high specific surface area (>100 $m^2/g$).

The SMC also contains a negative electrode (including a current collector and/or an anode active material) containing a high surface area having a lithium-storing or lithium-capturing surface (preferably nano-structured with nano-scaled or meso-scaled pores), a porous separator disposed between the two electrodes, a lithium-containing electrolyte in physical contact with the two electrodes, and a lithium ion source implemented at the anode or the cathode. These lithium-capturing surfaces are in direct contact with electrolyte to directly capture lithium ions therefrom or to release lithium ions directly thereto. Preferred electrolyte types include organic liquid electrolyte, gel electrolyte, and ionic liquid electrolyte (preferably containing lithium salts dissolved therein), or a combination thereof, although one may choose to use aqueous or solid electrolytes.

The lithium ion source can be selected from a lithium chip, lithium foil, lithium powder, surface stabilized lithium particles, lithium film coated on a surface of an anode or cathode active material, or a combination thereof. In one preferred embodiment, the anode active material and/or current collector is prelithiated, or pre-coated or pre-plated with lithium. In addition to relatively pure lithium metal, the lithium source may be selected from a lithium metal alloy, a mixture of lithium metal or lithium alloy with a lithium intercalation compound, a lithiated compound, lithiated titanium dioxide, lithium titanate, lithium manganate, a lithium transition metal oxide, $Li_4Ti_5O_{12}$, or a combination thereof. The lithium intercalation compound or lithiated compound may be selected from the following groups of materials: (a) Lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Lithiated alloys or intermetallic compounds of Si, Ge, Sn, Pb, Sb, Bi, Zn, Al, Ti, Co, Ni, Mn, Cd, and their mixtures; (c) Lithiated oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof, or (d) Lithiated salts or hydroxides of Sn.

Although there is no limitation on the electrode thickness, the presently invented positive electrode preferably has a thickness greater than 5 μm, more preferably greater than 50 μm, and most preferably greater than 100 μM.

Not wishing to be constrained by any theory, we would like to offer the following theoretical considerations that perhaps are helpful to the readers. We will provide some insight as to how a surface-mediated energy storage device operates and why such a lithium ion-exchanging battery exhibits exceptional power densities un-matched by conventional supercapacitors and any other electrochemical devices. We will also shed some light on why the electrode thickness of a lithium cell (including the surface-mediated lithium ion-exchanging cell, partially surface-mediated lithium super-battery, and conventional lithium-ion battery) plays such a critical role in dictating the power density in such a dramatic manner.

Figure 1B:
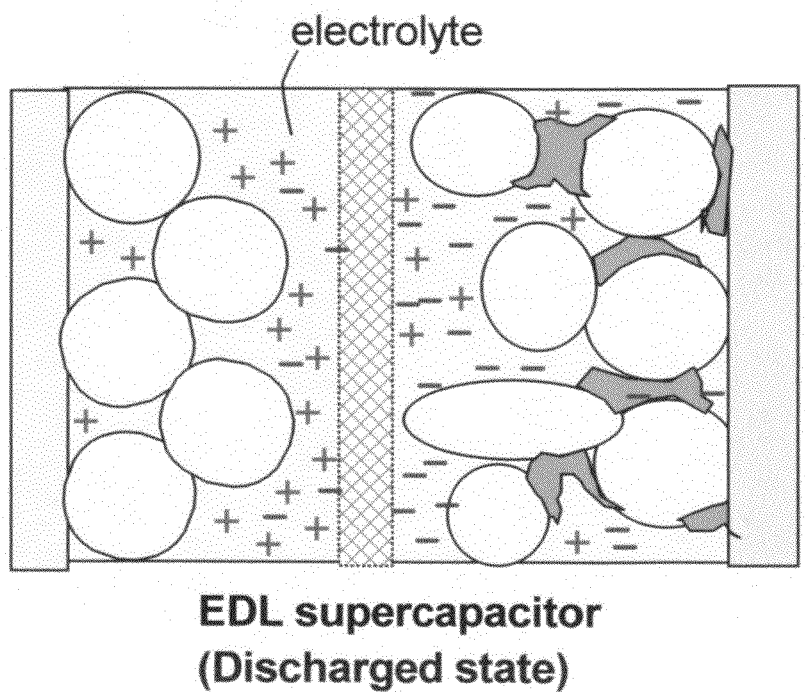
Figure 1C:
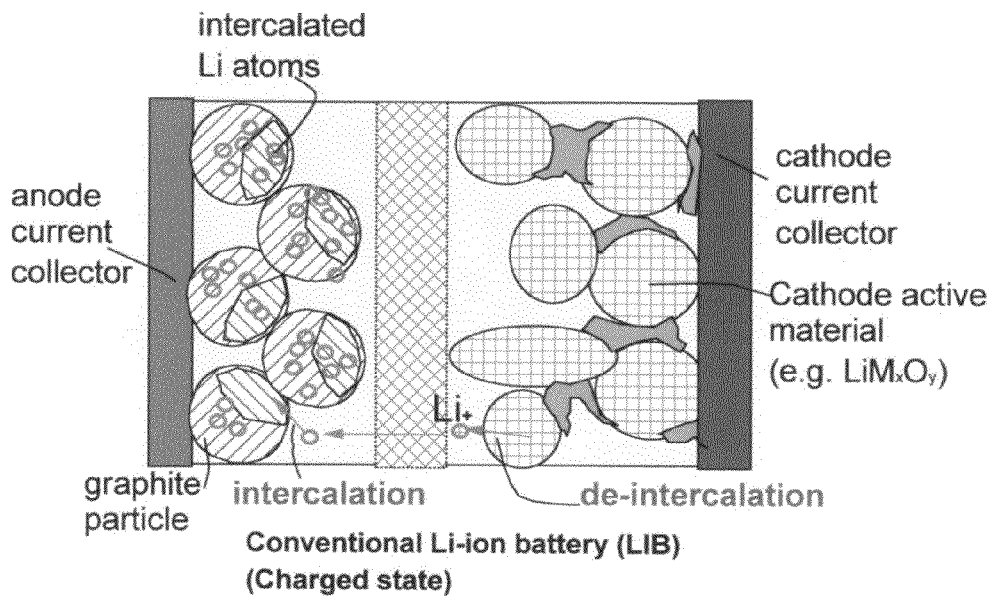
Figure 1D:
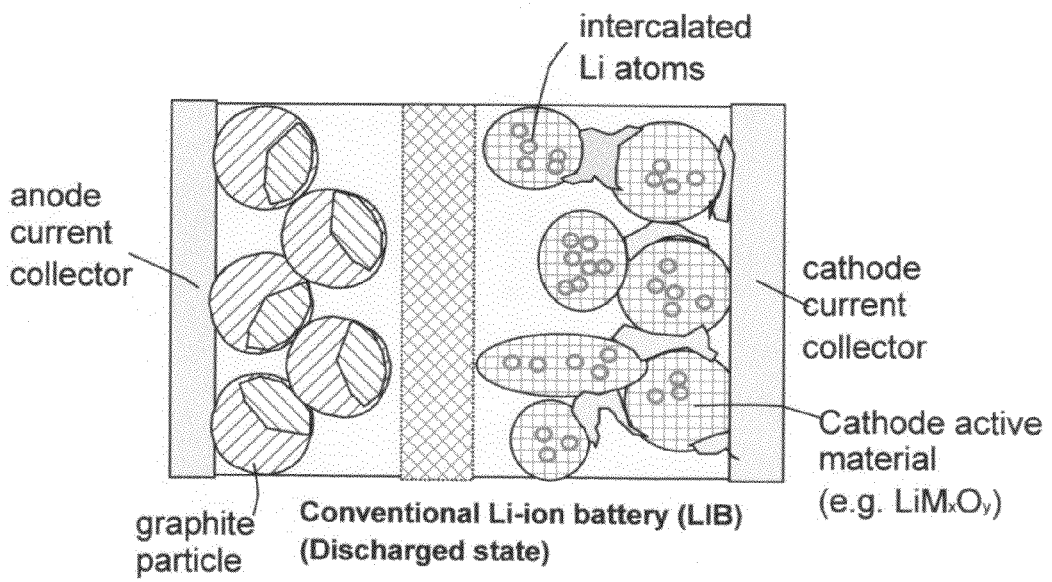

The internal structure of a conventional lithium-ion battery may be schematically shown in FIG. 1(C). In a battery discharge situation, lithium ions must diffuse (de-intercalate) out from the bulk of an anode active material particle, such as graphite, silicon, and lithium titanate (particle diameter=$d_a$ and the average solid-state diffusion distance=$d_a/2$), and then migrate in liquid electrolyte across the anode thickness (anode layer thickness=La and the average diffusion distance=La/2). Subsequently, lithium ions must move (in liquid electrolyte) across a porous separator (thickness=Ls), diffuse across part of the cathode thickness (thickness=Lc) in liquid electrolyte to reach a particular cathode active material particle (average diffusion distance=Lc/2), and then diffuse into (intercalate) the bulk of a particle (diameter=$d_c$ and the average solid-state diffusion distance required=$d_c/2$). In a re-charge situation, the lithium ions move in the opposite direction, but must travel approximately the same distances.

In other words, the operation of a conventional lithium-ion battery involves de-intercalation of lithium ions from the bulk (not the surface) of an electrode active material particle in one electrode (e.g., anode, during discharge) and intercalation of lithium ions into the bulk of an electrode active material particle in the opposite electrode (e.g. cathode). In general, diffusion through a liquid electrolyte is fast, but diffusion through a solid is dramatically slower (by 3-8 orders of magnitude). The presently invented surface-mediated cell (SMC) operates essentially on the exchange of massive lithium ions between the porous electrodes' surfaces (and not in the bulk of the electrode, as in lithium-ion batteries). This strategy completely removes the need for the time-consuming process of lithium intercalation and de-intercalation. The SMC is essentially intercalation-free, with most of the lithium being stored on the massive surface areas of the electrode active materials. Typically >90% of lithium atoms are captured on inorganic material surfaces at the cathode, and more typically less than a few percent of lithium could accidentally enter the interior of a multi-layer inorganic structure. The charge/discharge time of a SMC is limited only by the migration of lithium ions through liquid electrolyte (organic or ionic liquid), which is very fast and results in ultra-high power densities unmatched even by the supercapacitors (which are noted for their high power densities). This is further explained in what follows:

Assume that the diffusion coefficient of Li ions in a particular medium is D and a required travel distance is x, then the required diffusion time can be approximated as $t \sim x^2/D$, according to a well-known kinetics equation. As a first-order of approximation, the total required time scale for a lithium ion to complete a charge or discharge process may be estimated as:

$$t_{total}(La/2)^2/D_{electrolyte} + (d_a/2)^2/D_a + (Ls)^2/D_s + (Lc/2)^2/D_{electrolyte} + (d_c/2)^2/D_c \quad (1)$$

where $D_{electrolyte}$=Li ion diffusion coefficient in electrolyte, $D_a$=Li ion diffusion coefficient in an anode active material particle, $D_s$=Li ion diffusion coefficient through a porous separator, and $D_c$=Li ion diffusion coefficient in a cathode active material particle.

Representative diffusion coefficients of $Li^+$ in or through various liquid mediums or solid membrane or particles are given below (based on open literature data): liquid electrolyte ($2 \times 10^{-6}$ $cm^2/s$); separator ($7.5 \times 10^{-7}$ $cm^2/s$); $LiFePO_4$ cathode ($10^{-13}$ $cm^2/s$); $Li_3V_2(PO_4)_3$ cathode ($10^{-13}$ to $10^{-9}$ $cm^2/s$); nano-Si anode ($10^{-12}$ $cm^2/s$); graphite anode ($1-4 \times 10^{10}$ $cm^2/s$); and $Li_4Ti_5O_{12}$ anode ($1.3 \times 10^{-11}$ $cm^2/s$). This implies that, for a conventional lithium ion battery cell wherein LiFePO$_4$ particles are used as a cathode active material, the final term, $(d_c/2)^2/D_c$, in Eq. (1) dominates the required total diffusion time due to its excessively low diffusion coefficient. Actually, the value of diffusion coefficient varies between $10^{-10}$ and $10^{-16}$ cm$^2$/s, depending on the lithium content in solid solution Li$_x$FePO$_4$ and Li$_{1-x}$FePO$_4$ (X<0.02) or the LiFePO$_4$/FePO$_4$ phase ratio.

Figure 3:
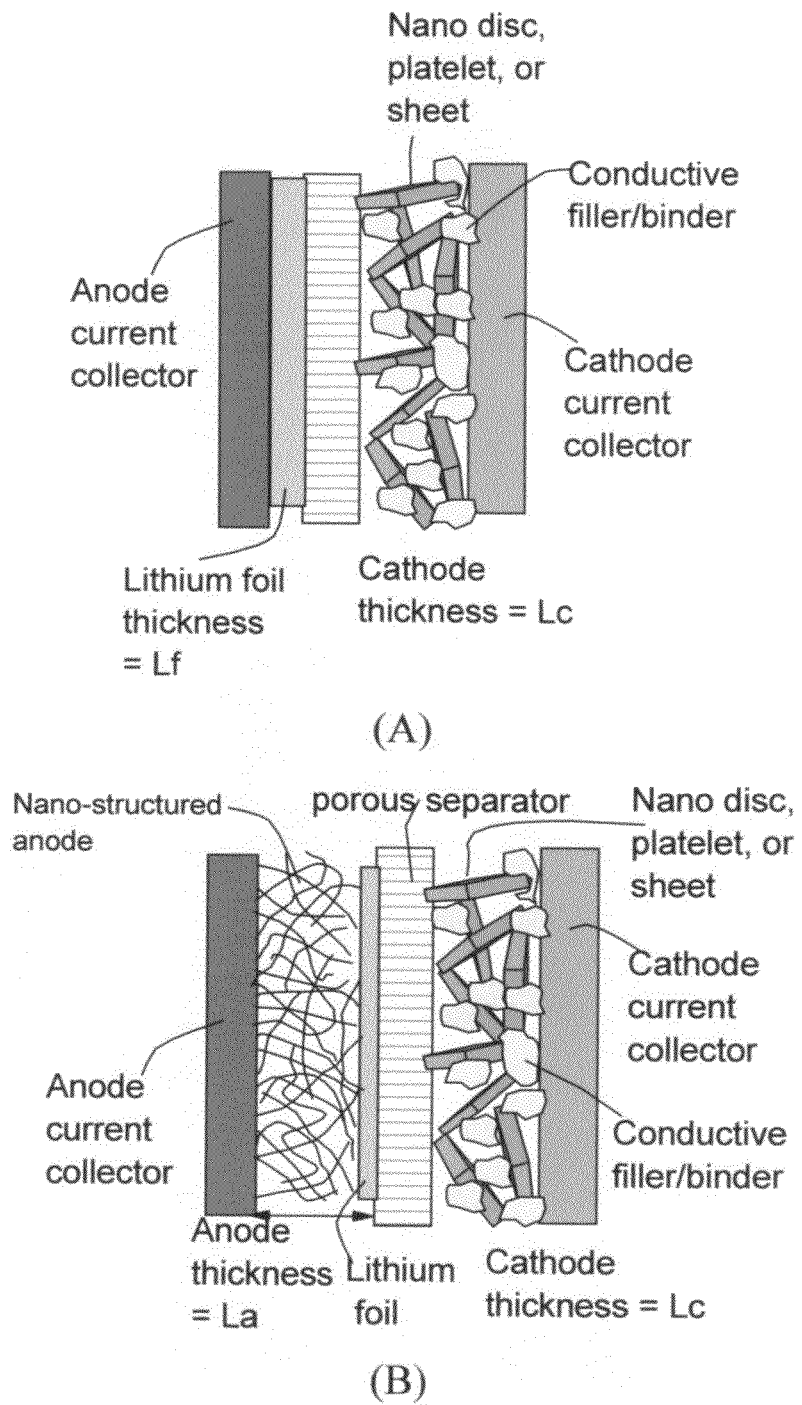
FIG. 3 (A) one example of a SMC with a lithium foil anode (and an anode current collector, but no anode active material) and a cathode made of inorganic material having a high electrode specific surface area; and (B) another example of the presently invented SMC, which contains a nano-structured conducting material at the anode, a lithium source (e.g. lithium foil or surface-passivated lithium powder), a porous separator, liquid or gel electrolyte, and a nano-structured or meso-porous inorganic material at the cathode having a high specific surface area.
Figure 4:
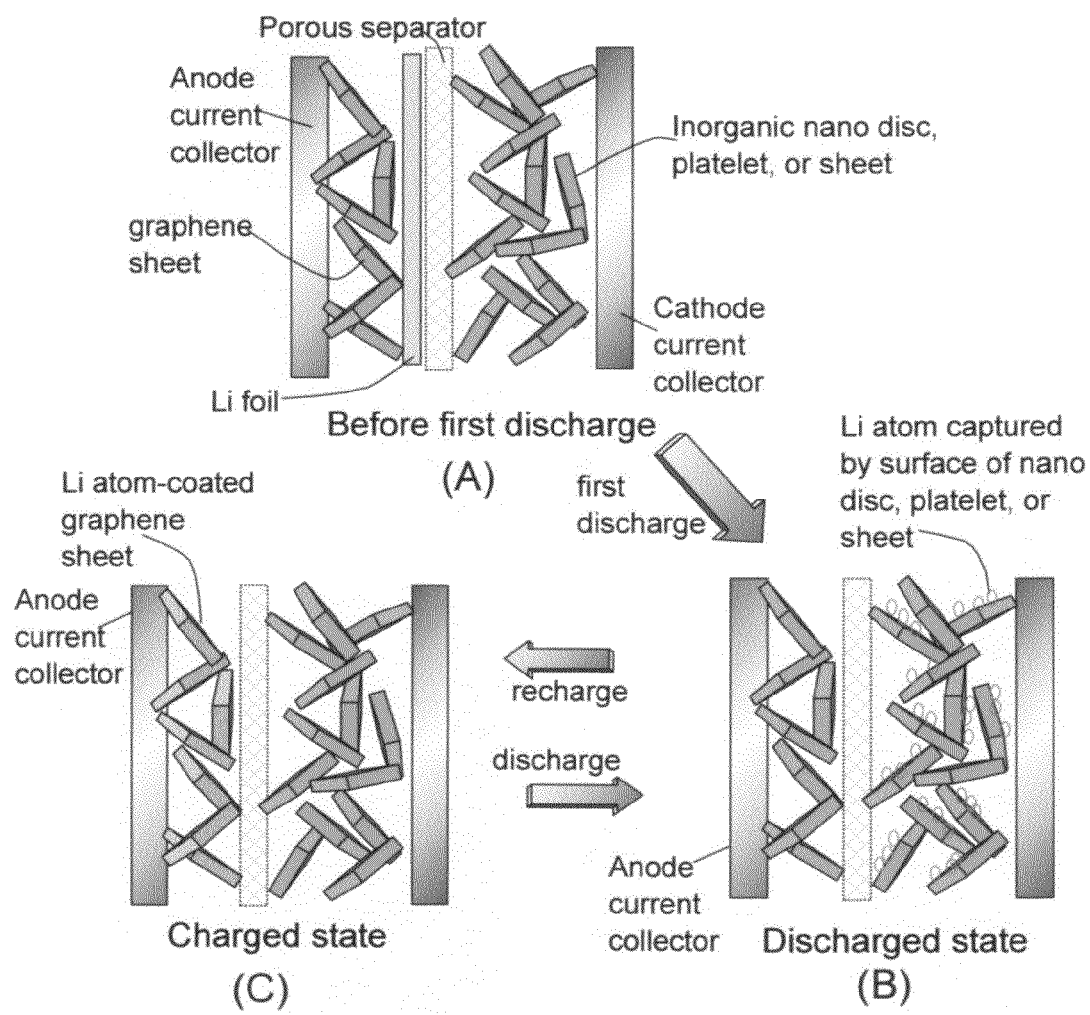
FIG. 4 (A) The structure of an inorganic cathode-based SMC when it is made (prior to the first discharge or charge cycle), containing a nano-structured material at the anode (having a high specific surface area), a lithium source (e.g. lithium foil), a porous separator, liquid electrolyte, a nano-structured inorganic material at the cathode; (B) The structure of this battery device after its first discharge operation (lithium is ionized with the lithium ions diffusing through liquid electrolyte to reach the surfaces of nano-structured cathode and get rapidly captured by these surfaces); (C) The structure of this battery device after being re-charged (lithium ions are released from the cathode surfaces, diffusing through liquid electrolyte to reach the surfaces of the nano-structured anode and get rapidly plated onto these surfaces). The huge surface areas can serve as a supporting substrate onto which massive amounts of lithium ions can electro-deposit concurrently.
Figure 5:
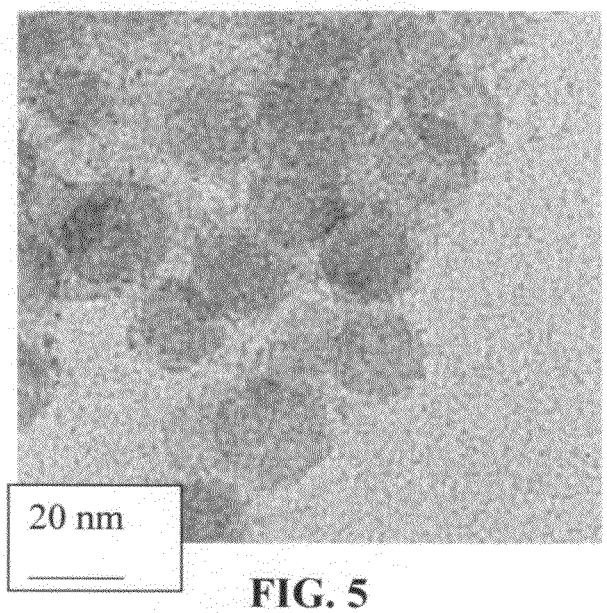
FIG. 5 A TEM image of $ZrS_2$ nano discs.

In contrast, in a partially surface-mediated cell containing a meso-porous cathode and a lithium metal foil as the anode (schematically illustrated in FIG. 3(A)), Li ions do not have to diffuse through a solid-state cathode particle and, hence, are not subject to the limitation by a low solid-state diffusion coefficient at the cathode (e.g. $10^{-13}$ cm$^2$/s in a LiFePO$_4$ particle). Instead, the cathode active materials are highly porous, allowing liquid electrolyte to reach the interior of the pores where the functional groups are present to readily and reversibly react with lithium ions that diffuse into these pores through a liquid medium (not a solid medium) with a high diffusion coefficient (e.g., $2\times10^{-6}$ cm$^2$/s). In such a p-SMC, the final term, $(d_c/2)^2/D_c$, in Eq. (1) is practically non-existing. The required total diffusion time is now dictated by the thicknesses of the electrodes and the separator. The above discussion is based on the premise that the reversible reaction between a surface active site and a lithium ion in the electrolyte is fast, and the whole charge-discharge process is not reaction-controlled.

Figure 1E:
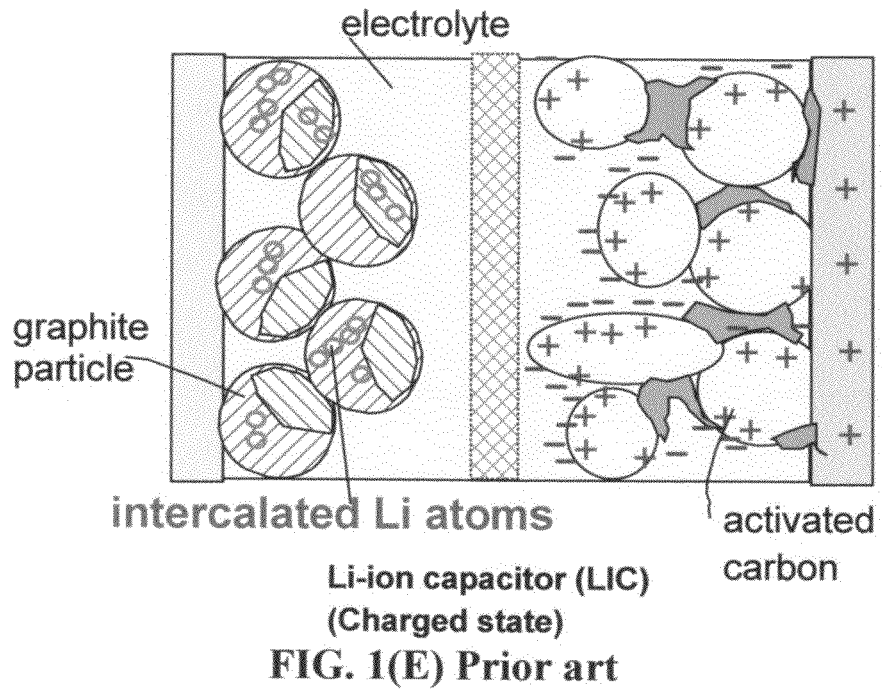
Figure 1F:
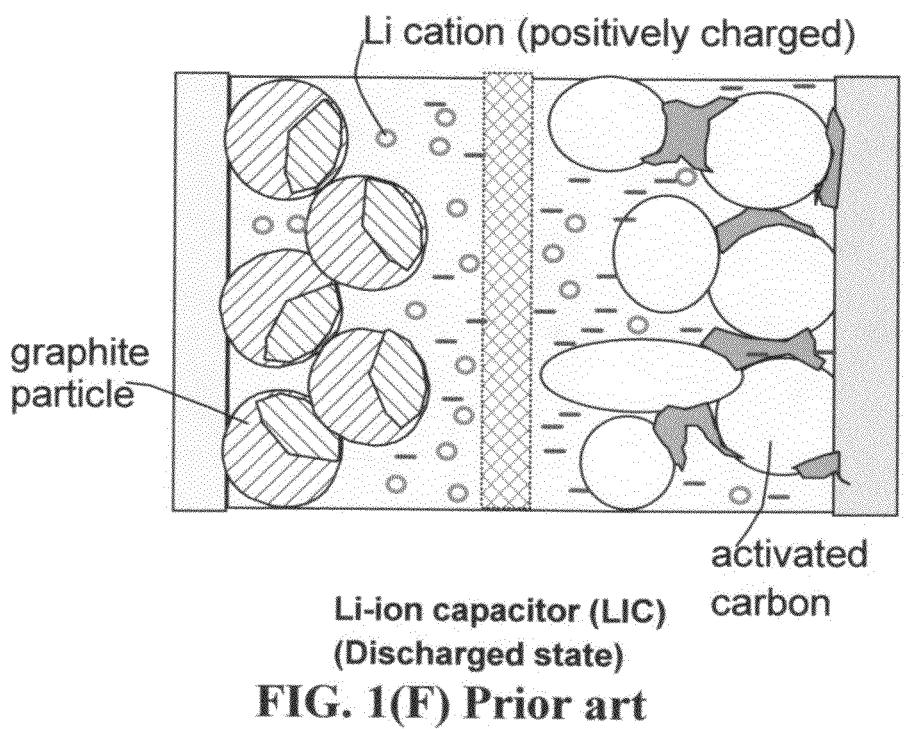
Figure 1G:
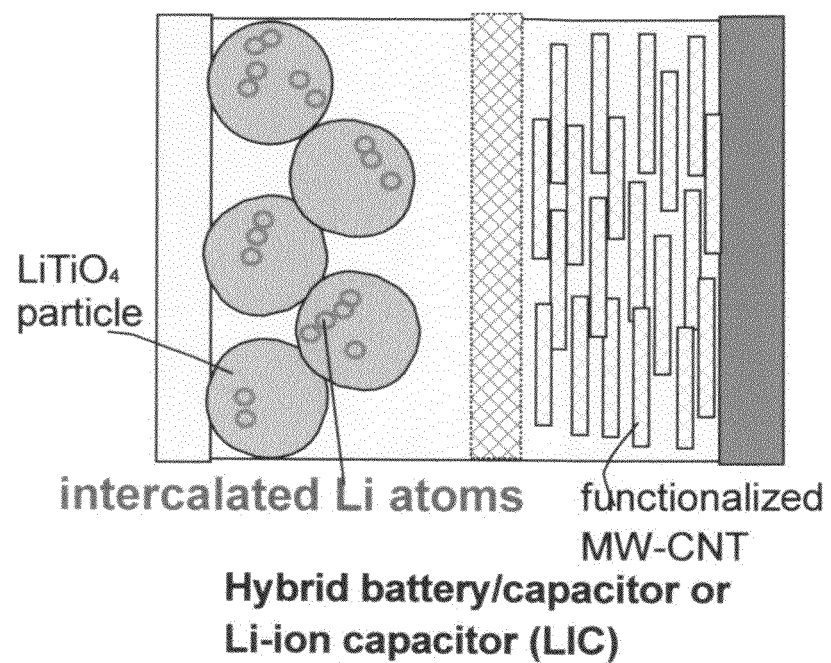
Figure 2:
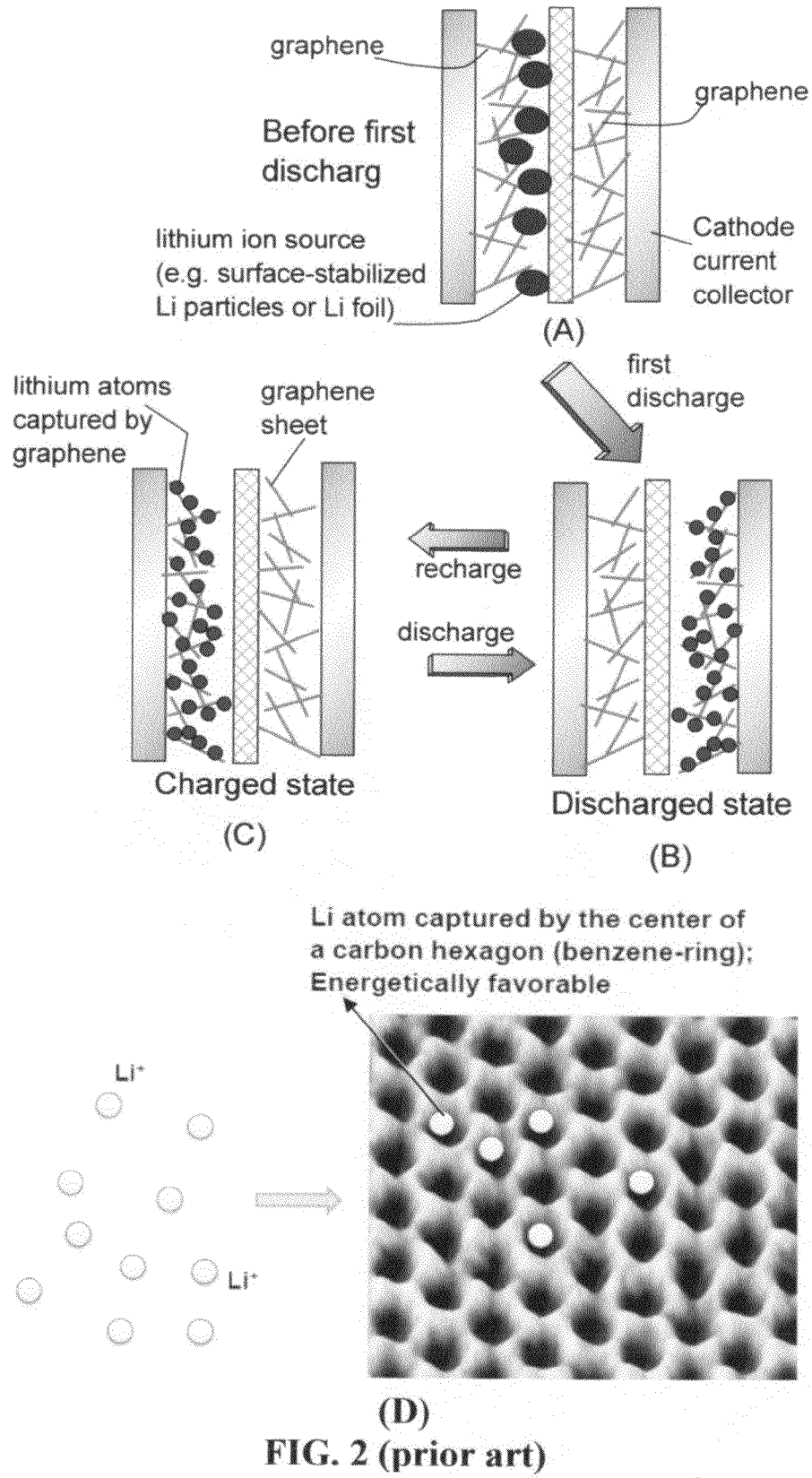
FIG. 2 (A) The structure of a SMC when it is made (prior to the first discharge or charge cycle), containing a nano-structured material at the anode, a lithium source (e.g. lithium foil), a porous separator, liquid electrolyte, a porous nano-structured material at the cathode having a high specific surface area; (B) The structure of this SMC after its first discharge operation (lithium is ionized with the lithium ions diffusing through liquid electrolyte to reach the surfaces of nano-structured cathode and get rapidly captured by these surfaces); (C) The structure of this battery device after being re-charged (lithium ions are released from the cathode surfaces, diffusing through liquid electrolyte to reach the surfaces of the nano-structured anode and get rapidly plated onto these surfaces). The large surface areas can serve as a supporting substrate onto which massive amounts of lithium ions can electro-deposit concurrently; (D) Center of carbon hexagon in a graphene sheet can readily capture a lithium atom and store thereon; (D) The surface capturing and releasing steps are fast, enabling a SMC cell to charge or discharge in just seconds.

In a prior art lithium-ion capacitor (LIC), the cathode is a meso-porous structure of a carbon material (e.g., activated carbon or CNT bundles), but lithium titanate or graphite particles constitute the anode (schematically illustrated in FIG. 1(E)). In a cell discharge situation, lithium ions must diffuse out of lithium titanate particles or graphite particles (a slow de-intercalation step), and then migrate in liquid electrolyte across the anode thickness. Subsequently, lithium ions must move (in liquid electrolyte) across a porous separator, diffuse across part of the cathode thickness in liquid electrolyte to reach a location close to a surface area of a nano-structured cathode active material. There is no need for solid-state diffusion at the cathode side. The whole process is essentially dictated by the solid-state diffusion at the anode. Hence, this LIC should exhibit a slower kinetic process (hence, a lower power density) as compared to the partially surface-mediated cell.

By plugging representative values of the various parameters in Eq. (1) we obtain the total lithium migration time required of a battery charge or discharge process for several conventional lithium-ion battery types and several prior art lithium super-battery cells and LICs. The first group is a conventional lithium-ion battery with a graphite particle anode and lithium iron phosphate cathode (Gr/LiFePO$_4$). The second and third groups are both conventional Li-ion batteries with a LiFePO$_4$ cathode and a Si particle- or lithium titanate-based anode, respectively (Nano-Si/LiFePO$_4$ and Li$_4$Ti$_5$O$_{12}$/LiFePO$_4$). The fourth group is a LIC (Li$_4$Ti$_5$O$_{12}$/f-CNM) where the anode is composed of Li$_4$Ti$_5$O$_{12}$ particles and the cathode is carbon nano material (f-CNM), such as CNT or activated carbon (AC). The fifth group is a partially surface-mediated cell where the anode is a lithium foil and the cathode is a carbon nano material or non-carbon inorganic material. These data are shown in Table 1(a) and (b) below:

TABLE 1(a)

Parameters used in the present calculations (CNM = carbon nano materials, including carbon nanotubes (CNTs), nano graphene platelets (NGPs), disordered carbon, etc; Gr = graphite; and Meso = meso-porous cathode structure).

| Cell Type (Anode/Cathode) | $D_{li}$ in Electrolyte cm$^2$/s | La (um) | Anode Particle Dia., da (um) | $D_{li}$ in anode Particle cm$^2$/s | Sep. thick. (um) | $D_{li}$ in separator cm$^2$/s | Lc (um) | Cathode Particle Dia., dc (um) | $D_{li}$ in cathode particle cm$^2$/s | Total diffusion time (sec) |
|---|---|---|---|---|---|---|---|---|---|---|
| Gr/LiFePO$_4$ | 1.00E−06 | 200 | 20 | 2.00E−10 | 100 | 7.50E−07 | 200 | 1 | 1.0E−13 | 3.02E+04 |
| Gr/LiFePO$_4$-nano | 1.00E−06 | 200 | 20 | 2.00E−10 | 100 | 7.50E−07 | 200 | 0.1 | 1.0E−13 | 5.48E+03 |
| Gr/LiFePO$_4$-nano | 1.00E−06 | 200 | 1 | 2.00E−10 | 100 | 7.50E−07 | 200 | 0.1 | 1.0E−13 | 4.96E+02 |
| Nano-Si/LiFePO$_4$ | 1.00E−06 | 200 | 0.1 | 1.00E−12 | 100 | 7.50E−07 | 200 | 0.1 | 1.0E−13 | 5.08E+02 |
| Li$_4$Ti$_5$O$_{12}$/LiFePO$_4$ | 1.00E−06 | 200 | 0.1 | 1.30E−11 | 100 | 7.50E−07 | 200 | 0.1 | 1.0E−13 | 4.85E+02 |
| Li$_4$Ti$_5$O$_{12}$/LiFePO$_4$ | 1.00E−06 | 100 | 0.05 | 1.30E−11 | 50 | 7.50E−07 | 100 | 0.05 | 1.0E−13 | 1.21E+02 |
| Li$_4$Ti$_5$O$_{12}$/f-CNM | 1.00E−06 | 200 | 0.1 | 1.30E−11 | 100 | 7.50E−07 | 200 | 0.1 | 1.0E−6 | 2.35E+02 |
| Li$_4$Ti$_5$O$_{12}$/f-CNM | 1.00E−06 | 20 | 0.1 | 1.30E−11 | 20 | 7.50E−07 | 20 | 0.1 | 1.0E−6 | 5.26E+00 |
| Li$_4$Ti$_5$O$_{12}$/f-CNM | 1.00E−06 | 2 | 0.1 | 1.30E−11 | 2 | 7.50E−07 | 2 | 0.1 | 1.0E−6 | 1.96E+00 |
| Li$_4$Ti$_5$O$_{12}$/f-CNM | 1.00E−06 | 2 | 0.1 | 1.30E−11 | 2 | 1.00E−06 | 0.2 | 0.1 | 1.0E−6 | 1.94E+00 |
| Li foil/meso | 1.00E−06 | 10 | 0 | 1.30E−11 | 10 | 7.50E−07 | 0.3 | 0.1 | 1.0E−6 | 5.84E−01 |
| Li foil/meso | 1.00E−06 | 10 | 0 | 1.30E−11 | 10 | 7.50E−07 | 3 | 0.1 | 1.0E−6 | 6.06E−01 |
| Li foil/meso | 1.00E−06 | 30 | 0 | 1.30E−11 | 10 | 7.50E−07 | 30 | 0.1 | 1.0E−6 | 4.83E+00 |
| Li foil/meso | 1.00E−06 | 30 | 0 | 1.30E−11 | 10 | 7.50E−07 | 200 | 0.1 | 1.0E−6 | 1.03E+02 |

TABLE 1(b)

The required diffusion time to reach a particle in the anode ($t_{La}$), diffusion in the anode particle (ta), diffusion time through the separator (ts), diffusion time to reach a cathode particle ($t_{Lc}$), and the diffusion time in the cathode particle (tc).

| $t_{La}$ (sec) | Ta (sec) | Ts (sec) | $t_{Lc}$ (sec) | Tc (sec) | Total time (sec) | Total time (hours) | Cell type |
|---|---|---|---|---|---|---|---|
| 1.00E+02 | 5.00E+03 | 3.33E+01 | 1.00E+02 | 1.39E+05 | 3.02E+04 | 8.40 | Gr/LiFePO$_4$ |
| 1.00E+02 | 5.00E+03 | 3.33E+01 | 1.00E+02 | 1.39E+03 | 5.48E+03 | 1.52 | Gr/LiFePO$_4$-nano |
| 1.00E+02 | 1.25E+01 | 3.33E+01 | 1.00E+02 | 1.39E+03 | 4.96E+02 | 0.138 | Gr/LiFePO$_4$-nano |
| 1.00E+02 | 2.50E+01 | 3.33E+01 | 1.00E+02 | 1.39E+03 | 5.08E+02 | 0.141 | Nano-Si/LiFePO$_4$-n |
| 1.00E+02 | 1.92E+00 | 3.33E+01 | 1.00E+02 | 1.39E+03 | 4.85E+02 | 0.135 | Li$_4$Ti$_5$O$_{12}$/LiFePO$_4$-n |

TABLE 1(b)-continued

The required diffusion time to reach a particle in the anode ($t_{La}$), diffusion in the anode particle (ta), diffusion time through the separator (ts), diffusion time to reach a cathode particle ($t_{Lc}$), and the diffusion time in the cathode particle (tc).

| $t_{La}$ (sec) | Ta (sec) | Ts (sec) | $t_{Lc}$ (sec) | Tc (sec) | Total time (sec) | Total time (hours) | Cell type |
|---|---|---|---|---|---|---|---|
| 2.50E+01 | 4.81E−01 | 8.33E+00 | 2.50E+01 | 3.47E+02 | 1.21E+02 | 0.00337 | $Li_4Ti_5O_{12}$/$LiFePO_4$-n |
| 1.00E+02 | 1.92E+00 | 3.33E+01 | 1.00E+02 | 2.50E−05 | 2.35E+02 | 6.53E−02 | $Li_4Ti_5O_{12}$/f-CNM |
| 1.00E+00 | 1.92E+00 | 1.33E+00 | 1.00E+00 | 2.50E−05 | 5.26E+00 | 1.46E−03 | $Li_4Ti_5O_{12}$/f-CNM |
| 1.00E−02 | 1.92E+00 | 1.33E−02 | 1.00E−02 | 2.50E−05 | 1.96E+00 | 5.43E−04 | $Li_4Ti_5O_{12}$/f-CNM |
| 1.00E−02 | 1.92E+00 | 1.00E−02 | 1.00E−02 | 2.50E−05 | 1.94E+00 | 5.40E−04 | $Li_4Ti_5O_{12}$/f-CNM |
| 2.50E−01 | 0.00E+00 | 3.33E−01 | 2.25E−04 | 2.50E−05 | 5.84E−01 | 1.62E−04 | Li foil/meso |
| 2.50E−01 | 0.00E+00 | 3.33E−01 | 2.25E−02 | 2.50E−05 | 6.06E−01 | 1.68E−04 | Li foil/meso |
| 2.25E+00 | 0.00E+00 | 3.33E−01 | 2.25E+00 | 2.50E−05 | 4.83E+00 | 1.34E−03 | Li foil/meso |
| 2.25E+00 | 0.00E+00 | 3.33E−01 | 1.00E+02 | 2.50E−05 | 1.03E+02 | 2.85E−02 | Li foil/meso |

Several significant observations can be made from the data of Table 1(a) and (b):

(1) Conventional lithium ion batteries (first group above) featuring a micron-sized graphite particle anode (graphite diameter=20 μm) and a micron-sized $LiFePO_4$ cathode (particle diameter=1 μm) would require several hours (e.g. 8.4 h) to complete the required lithium ion diffusion process. This is why conventional lithium ion batteries exhibit very low power densities (typically 100-500 W/Kg) and very long re-charge times.

(2) This problem of a long diffusion time can be partially alleviated by using nano-scaled particles, as in the second and third groups above (e.g., 8 minutes if both the anode and cathode active material particles have a diameter of 100 nm).

(3) In contrast, for the LIC featuring a carbon cathode (e.g. f-CNT) and an anode of $Li_4Ti_5O_{12}$ nano particles, the required diffusion times are between 235 sec (<4 minutes) for a cathode thickness of 200 μm and 1.96 sec for an ultra-thin cathode (e.g., 0.3 μm).

(4) For the partially surface-mediated cell, the electrode thickness is a dominating factor. For instance, in the case of using lithium metal foil as the anode (first type), the total diffusion time can be as short as <0.6 sec (when the cathode thickness is 0.3 μm or 3 μm), which increases to 103 sec (still less than 2 minutes) when the cathode thickness is 200 μm.

(5) The above observations imply that the lithium super-batteries should have an extraordinary power density, particularly when the electrodes are ultra-thin. However, a useful electrode size is at least 50 μm in thickness (typically between 100 and 300 μm) and, again, the cells with a cathode thickness of 0.3-3.0 μm have very limited practical utility value. Our inorganic nano material-based surface-mediated cells (typically having an electrode thickness of 100-300 μm) perform exceptionally well. Our electrodes are prepared by the techniques commonly used by the lithium-ion battery industry using exactly the same equipment.

It may be noted that the above calculations for the partially surface-mediated cell (p-SMC) containing a lithium foil as the anode are applicable to the fully surface-mediated cell (f-SMC) as well, with the exception that the lithium foil thickness may be replaced by the thickness of a liquid electrolyte-filled nano-structured anode. The lithium source (lithium particles or pieces of lithium foil) would not add additional anode thickness value in the time calculations since the nano-structured anode is "elastic" or compressible. The lithium foil may be compressed against the nano-structured anode, or the lithium particles may be incorporated in the nano-structured anode when the battery device is made. Once lithium particles or foil are ionized during the first discharge cycle, the nano-structured anode (e.g. NGP or CNT-based mat) would snap back to touch the separator. Based on the above calculations, the required diffusion times for the super-battery (partially surface-mediated) and those for the totally surface-controlled (surface-mediated) cell should be approximately the same.

It may be noted that, for the p-SMC where the anode is a lithium foil, there is no anode particle and, hence, no particle diameter ($d_a$ was assigned as zero in the above calculation). During the first discharge, Li foil is electrochemically ionized to release ions. In the above calculations, this surface-controlled reaction was assumed to be fast and not rate-limiting. In reality, this surface reaction can become rate-limiting when a high discharge rate is required (i.e. when the external circuit or load demands a high current density). This limitation may not be controlled by the surface ionization rate itself, but instead by the limited amount of surface area of the lithium foil during the first discharge cycle. In other words, at a given moment of time during the first discharge, there is only so much surface area from which lithium ions can be released simultaneously.

During the re-charge cycle, lithium ions move back from the cathode to the anode side, trying to re-deposit onto a surface of the anode current collector (e.g. a copper foil), which is the only surface available at the anode of a partially surface-mediated cell. There are two serious issues associated with using a current collector (e.g. copper foil) alone to accommodate the in-flux of massive lithium ions during re-charge:

(1) If the re-charge rate is high (with a high circuit current density), the huge numbers of lithium ions that rapidly migrate back to the anode side are all trying to deposit simultaneously onto the surface of a current collector, which typically has a very low surface area (specific surface area typically <<1 $m^2$/g for Cu foil). This limited surface area becomes deposition rate-limiting.

(2) If the re-charge rate is low (with a low current density), the returning lithium ions could find a way to deposit onto the current collector surface in a non-uniform manner. Certain favorable spots will receive more deposited lithium atoms first, and these spots could continue to be deposited at a higher rate. Such a non-uniform lithium deposition could lead to the formation of dendrites at the anode, which could grow longer and longer as the number of cycles increases, and eventually penetrate through the separator to reach the cathode side, causing internal shorting. This possibility could pose a similar problem that plagued the lithium metal battery industry in late 1980s and eventually resulted in the termination of essentially all the lithium metal cell productions in early 1990s.

After an extensive and in-depth study, the applicants have solved these two issues by implementing a nano-structured anode between an anode current collector and a porous separator. This nano-structured anode is preferably composed of a nano carbon material having a high specific surface area (preferably greater than 100 $m^2/g$), such as the nano graphene platelet (NGP, collectively referring to both single-layer and multi-layer versions of graphene, graphene oxide, graphene fluoride, doped graphene, etc), non-functionalized carbon nano-tube (single-walled or multi-walled), carbon nano-fiber (vapor-grown, electro-spun polymer derived, etc), disordered carbon, metal nano-wire, conductive nano-wire, etc. The nano-structured anode preferably has a specific surface area greater than 100 $m^2/g$, more preferably greater than 500 $m^2/g$, further preferably greater than 1,000 $m^2/g$, even more preferably greater than 1,500 $m^2/g$, and most preferably greater than 2,000 $m^2/g$. These surfaces are preferably in direct contact with electrolyte (preferably organic liquid electrolyte) to capture lithium ions directly therefrom or to release lithium ions directly thereto.

It is quite unexpected for us to observe that the implementation of this nano-structured anode significantly increases not only the power density (Kw/Kg), but also the energy density (Wh/Kg) of the SMC. We were really very surprised to observe these highly significant observations (presented in the Examples of this specification). Not wishing to be limited by the theory, but we believe that this implemented nano-structured anode plays at least the following three roles:

(1) During the re-charge cycle, the massive surface areas of this nano-structured anode enable huge numbers of lithium ions to be rapidly deposited simultaneously in a high current density situation (high charge rate). This makes it possible for the energy storage device to be re-charged in seconds or fractions of a second. This had not been possible with any prior art lithium metal or lithium ion battery.

(2) During the first discharge operation of a freshly made surface-mediated cell of the instant invention, the lithium foil or lithium particles get ionized, releasing lithium ions at the anode which travel into the cathode side and get captured by the surfaces of the meso-porous cathode. Upon re-charging, these lithium ions return to the anode and uniformly deposit onto the massive surfaces of the nano-structured anode, forming an ultra-thin coating of lithium thereon. Such a huge surface area of lithium-decorated surfaces enables simultaneous release of great amounts of lithium ions during subsequent discharge cycles. This concurrent, massive releasing of lithium ions had not been possible in a battery with an anode current collector alone whose specific surface area is normally much less than 1 $m^2/g$. The high specific surface area of the nano-structured anode, >>100 $m^2/g$, enables both fast charging and fast discharging, achieving an unprecedented power density.

(3) The nano-structured anode, electronically connected to a current collector, also provides a uniform electric field in the anode space, allowing the returning lithium ions to more homogeneously deposit onto the surface of nano materials (e.g. graphene). Since huge surface areas are available for this purpose, only an extremely small amount of lithium is deposited onto any single spot, insufficient for the growth of a dendrite. These reasons imply that the presently invented surface-controlled energy storage device is a safer energy storage device.

This new surface-mediated, lithium ion-exchanging battery device is also patently distinct from the conventional supercapacitor in the following aspects:

(1) The conventional or prior art supercapacitors do not have a lithium ion source implemented at the anode when the cell is made.

(2) The electrolytes used in these prior art supercapacitors are mostly lithium-free or non-lithium-based. Even when a lithium salt is used in a supercapacitor electrolyte, the solubility of lithium salt in a solvent essentially sets an upper limit on the amount of lithium ions that can participate in the formation of electric double layers of charges inside the electrolyte phase (near but not on an electrode material surface, as illustrated in FIG. 1(B)). As a consequence, the specific capacitance and energy density of the resulting supercapacitor are relatively low (e.g. typically <6 Wh/kg based on total cell weight), in contrast to, for instance, 160 Wh/kg (based on total cell weight) of the presently invented surface-mediated cells.

(3) The prior art supercapacitors are based on either the electric double layer (EDL) mechanism or the pseudo-capacitance mechanism to store their charges. In both mechanisms, no massive lithium ions are exchanged or shuttled between the two electrodes (even when a lithium salt is used in electrolyte). In the EDL mechanism, for instance, the cations and anions in the electrolyte swim to opposite electrodes to form electric double layers of charges near the surfaces of an electrode active material (but not on the surface) when the EDL supercapacitor is charged. The cations are not captured or stored in or on the surfaces of the electrode active material. In contrast, when a SMC is charged, the cations ($Li^+$ ions) are electro-plated onto the surface of a current collector or deposited on the surfaces of an anode active material.

When an EDL supercapacitor is discharged, the cations simply leave the EDL zones near the anode side and the anions leave the EDL zones near the cathode side; both the cations and the anions are randomly dispersed in the liquid electrolyte. (The cations are not transferred to the cathode to deposit on the cathode surfaces.) In contrast, in a SMC of the present invention, lithium ions are rapidly released from the anode surfaces and swim across the separator into the cathode zones. The lithium ions are captured by the surfaces of an inorganic nano disc, nano platelet, or nano sheet at the cathode. In other words, massive lithium ions are shuttled between the anode surfaces and the cathode surfaces during the charge and discharge of a SMC.

(4) The prior art symmetric supercapacitors (EDL supercapacitors) using a lithium salt-based organic electrolyte operate only in the range of 0-2.7 volts. They cannot operate above 2.7 volts; there is no additional charge storing capability beyond 2.7 volts. We have tested a broad array of carbon nano materials (including graphene, CNT, meso-porous carbon, activated carbon, carbon black, carbon fiber, carbon aerogel, etc) and found that the symmetric supercapacitors using the same lithium-containing organic electrolyte as in the SMC just could not be charged to beyond 2.7 volts and actually the organic electrolyte typically begins to break down at 2.7 volts. The inorganic materials, being electrically insulating, could not be used as an electrode active material in a supercapacitor.

In contrast, the surface-mediated cells of the present invention operate typically in the range of 0.6-4.5 volts, more typically in the range of 1.2-4.5 volts, but often in the range of 1.5-4.5 volts. These two ranges of operating voltage (range of 1.5-4.5 volts vs. range of 0-2.7 volts) are reflections of totally distinct charge storage mechanisms. Even though, on the paper, there appears to be an overlap of 1.5-2.7 volts between these two voltage ranges (range of 1-2.7 and range of 1.5-4.5 volts), this overlap is artificial, sheer coincidental, and not scientifically meaningful since the charge storage mechanisms are fundamentally different, as evidenced by vastly different cyclic voltammetry (CV) diagrams.

(5) The prior art EDL supercapacitors typically have an open-circuit voltage of essentially 0 volts. In contrast, the SMC typically has an open-circuit voltage of >1.0 volts, more commonly >1.5 volts, and most commonly >2.0 volts, depending on the type and amount of the anode active material relative to the cathode, and the amount of the lithium source).

Figure 6:
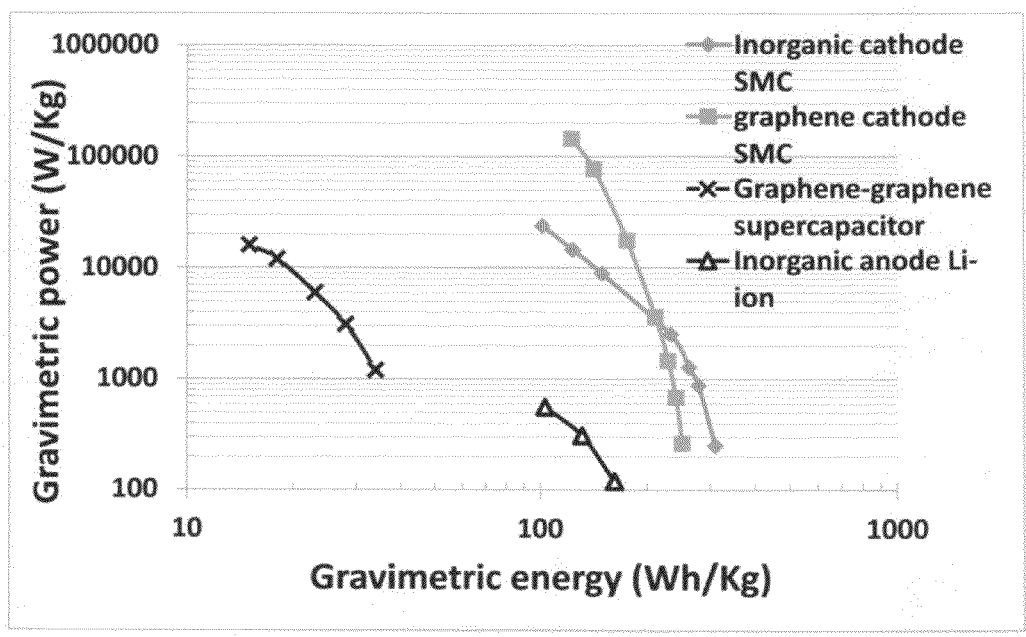
FIG. 6 Ragone plot of four types of electrochemical cells: A SMC cell using graphene as a cathode active material, a SMC cell using $ZrS_2$ nano discs as a cathode active material, a prior art graphene-graphene symmetric supercapacitor, and a lithium-ion cell using $ZrS_2$ nano discs as an anode active material and $LiCoO_2$ as a cathode active material.
Figure 7:
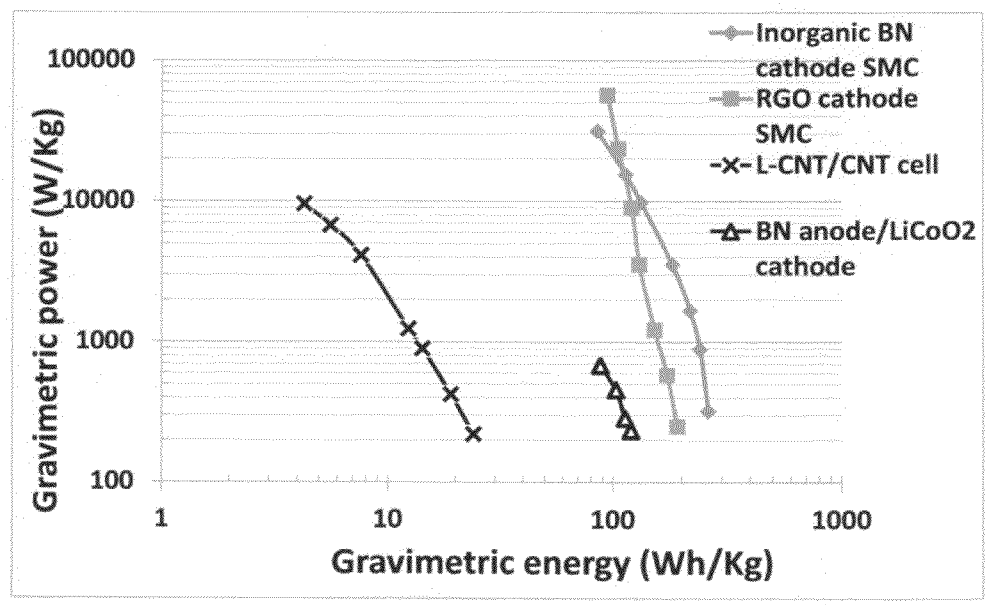
FIG. 7 Ragone plot of three types of electrochemical cells: a surface-mediated cell containing BN nano sheets as a cathode active material, a SMC containing reduced graphene oxide (RGO) as a cathode active material, and a prior art lithium-ion capacitor containing lithiated CNT bundles as the anode active material and non-lithiated CNT bundles as the cathode active material.

(6) The Ragone plots of FIGS. 6 and 7 have nicely demonstrated that the surface-mediated cells of the present invention are a class of energy storage cells by itself, distinct from both supercapacitors and lithium-ion batteries.

Nano-structured materials for use in the anode of the instant invention may preferably contain nano graphene platelet (NGP), non-functionalized and non-oxidized carbon nano-tube (CNT), disordered carbon, exfoliated graphite, activated carbon, meso-porous carbon, carbon black, carbon aerogel or foam, carbon nano-fiber, graphitic fiber, or a combination thereof. In most of our electrode materials, the oxygen content is less than 5% by weight and, more typically, essentially 0%.

Single-layer graphene or the graphene plane (a layer of carbon atoms forming a hexagonal or honeycomb-like structure) is a common building block of a wide array of graphitic materials, including natural graphite, artificial graphite, soft carbon, hard carbon, coke, activated carbon, carbon black, etc. In these graphitic materials, typically multiple graphene sheets are stacked along the graphene thickness direction to form an ordered domain or crystallite of graphene planes. Multiple crystallites of domains are then connected with disordered or amorphous carbon species. In the instant application, we are able to extract or isolate these crystallites or domains to obtain multiple-layer graphene platelets out of the disordered carbon species. In some cases, we exfoliate and separate these multiple-graphene platelets into isolated single-layer graphene sheets. In other cases (e.g. in activated carbon, hard carbon, and soft carbon), we chemically removed some of the disordered carbon species to open up gates, allowing liquid electrolyte to enter into the interior (exposing graphene surfaces to electrolyte).

In the present application, nano graphene platelets (NGPs) or "graphene materials" collectively refer to single-layer and multi-layer versions of graphene, graphene oxide, graphene fluoride, hydrogenated graphene, nitrogenated graphene, doped graphene, etc.

For the purpose of defining the geometry of an NGP, the NGP is described as having a length (the largest dimension), a width (the second largest dimension), and a thickness. The thickness is the smallest dimension, which is no greater than 100 nm and, in the present application, no greater than 10 nm (preferably no greater than 5 nm). The NGP may be single-layer graphene. When the platelet is approximately circular in shape, the length and width are referred to as diameter. In the presently defined NGPs, there is no limitation on the length and width, but they are preferably smaller than 10 μm and more preferably smaller than 1 μm. We have been able to produce NGPs with length smaller than 100 nm or larger than 10 μm. The NGP can be pristine graphene (with essentially 0% oxygen content, typically <2% oxygen) or graphene oxide (typically from 10 up to approximately 45% by weight oxygen). Graphene oxide can be thermally or chemically reduced to become reduced graphene oxide (typically with an oxygen content of 1-20%, mostly below 5% by weight). For use in the anode and/or the cathode of the lithium super-battery and functional material-based surface-controlled cells disclosed in our earlier applications, the oxygen content was preferably in the range of 5% to 30% by weight, and more preferably in the range of 10% to 30% by weight. However, in the instant application, the SMC electrode typically has less than 5% oxygen (hence, essentially functional group-free) and, in many cases, less than 2%. The specific surface area accessible to liquid electrolyte is the single most important parameter in dictating the energy and power densities of a SMC.

Despite the fact that individual graphene sheets have an exceptionally high specific surface area, flat-shaped graphene sheets prepared by conventional routes have a great tendency to re-stack together or overlap with one another, thereby dramatically reducing the specific surface area that is accessible by the electrolyte. We have developed a new breed of graphene, herein referred to as the curved graphene platelet or sheet. Curved NGPs are capable of forming a meso-porous structure having a desired pore size range (e.g. slightly >2 nm) when they were stacked together to form an electrode. This size range appears to be conducive to being accessible by the commonly used lithium-containing electrolytes.

The curved NGPs may be produced by using the following recommended procedures:

(a) dispersing or immersing a laminar graphite material (e.g., natural graphite powder) in a mixture of an intercalant and an oxidant (e.g., concentrated sulfuric acid and nitric acid, respectively) to obtain a graphite intercalation compound (GIC) or graphite oxide (GO);

(b) exposing the resulting GIC or GO to a thermal shock, preferably in a temperature range of 600-1,100° C. for a short period of time (typically 15 to 60 seconds), to obtain exfoliated graphite or graphite worms (some oxidized NGPs with a thickness <100 nm could be formed at this stage if the intercalation/oxidation step was allowed to proceed for a sufficiently long duration of time; e.g. >24 hours);

(c) dispersing the exfoliated graphite to a liquid medium to obtain a graphene-liquid suspension (a functionalizing agent may be added into this suspension if functional groups are desired, as in our co-pending application);

(d) aerosolizing the graphene-liquid suspension into liquid droplets while concurrently removing the liquid to recover curved NGPs. Without the aerosolizing step, the resulting graphene platelets tend to be flat-shaped.

It may be noted that steps (a) to (b) are the most commonly used steps to obtain exfoliated graphite and graphene oxide platelets in the field. Step (d) is essential to the production of curved graphene sheets. Oxidized NGPs or GO platelets may be chemically reduced to recover conductivity properties using hydrazine as a reducing agent, before, during, or after chemical functionalization.

In 2007, we reported a direct ultrasonication method of producing pristine nano graphene directly from graphite particles dispersed in a surfactant-water suspension [A. Zhamu, et al, "Method of Producing Exfoliated Graphite, Flexible Graphite, and Nano-Scaled Graphene Plates," U.S. patent application Ser. No. 11/800,728 (May 8, 2007)]. This method entails dispersing natural graphite particles in a low surface tension liquid, such as acetone or hexane. The resulting suspension is then subjected to direct ultrasonication for 10-120 minutes, which produces graphene at a rate equivalent to 20,000 attempts to peel off graphene sheets per second per particle. The graphite has never been intercalated or oxidized and, hence, requires no subsequent chemical reduction. This method is fast, environmentally benign, and can be readily scaled up, paving the way to the mass production of pristine nano graphene materials. The same method was later studied by others and now more commonly referred to as the "liquid phase production."

The disordered carbon material may be selected from a broad array of carbonaceous materials, such as a soft carbon, hard carbon, polymeric carbon (or carbonized resin), mesophase carbon, coke, carbonized pitch, carbon black, activated carbon, or partially graphitized carbon. A disordered carbon material is typically formed of two phases wherein a first phase is small graphite crystal(s) or small stack(s) of graphite planes (with typically up to 10 graphite planes or aromatic ring structures overlapped together to form a small ordered domain) and a second phase is non-crystalline carbon, and wherein the first phase is dispersed in the second phase or bonded by the second phase. The second phase is made up of mostly smaller molecules, smaller aromatic rings, defects, and amorphous carbon. Typically, the disordered carbon is highly porous (e.g., activated carbon) or present in an ultrafine powder form (e.g. carbon black) having nano-scaled features (hence, a high specific surface area).

Soft carbon refers to a carbonaceous material composed of small graphite crystals wherein the orientations of these graphite crystals or stacks of graphene sheets are conducive to further merging of neighboring graphene sheets or further growth of these graphite crystals or graphene stacks using a high-temperature heat treatment (graphitization). Hence, soft carbon is said to be graphitizable. Hard carbon refers to a carbonaceous material composed of small graphite crystals wherein these graphite crystals or stacks of graphene sheets are not oriented in a favorable directions (e.g. nearly perpendicular to each other) and, hence, are not conducive to further merging of neighboring graphene sheets or further growth of these graphite crystals or graphene stacks (i.e., not graphitizable). Carbon black (CB), acetylene black (AB), and activated carbon (AC) are typically composed of domains of aromatic rings or small graphene sheets, wherein aromatic rings or graphene sheets in adjoining domains are somehow connected through some chemical bonds in the disordered phase (matrix). These carbon materials are commonly obtained from thermal decomposition (heat treatment, pyrolyzation, or burning) of hydrocarbon gases or liquids, or natural products (wood, coconut shells, etc).

Certain grades of petroleum pitch or coal tar pitch may be heat-treated (typically at 250-500° C.) to obtain a liquid crystal-type, optically anisotropic structure commonly referred to as meso-phase. This meso-phase material can be extracted out of the liquid component of the mixture to produce meso-phase particles or spheres. Physical or chemical activation may be conducted on all kinds of disordered carbon (e.g. a soft carbon, hard carbon, polymeric carbon or carbonized resin, meso-phase carbon, coke, carbonized pitch, carbon black, activated carbon, or partially graphitized carbon) to obtain activated disordered carbon. For instance, the activation treatment can be accomplished through oxidizing, $CO_2$ physical activation, KOH or NaOH chemical activation, or exposure to nitric acid, fluorine, or ammonia plasma (for the purpose of creating electrolyte-accessible pores, not for functionalization).

The term "aerogel" is used herein to include the related terms "xerogel" and "cyrogel" and "aerogel-xerogel", or "ambigel". By way of example, aerogels are obtained by pyrolyzing a cross-linked polymer gel, in particular of the phenol-aldehyde resin type (in particular resorcinol-formaldehyde). More specifically, the following steps can be followed to make aerogels: Step 1 involves preparing an aqueous solution of a sol of a mixture of polymer or polymer precursor and a cross-linking agent, in particular of the phenol-aldehyde resin type (in particular resorcinol-formaldehyde). This is followed by step 2, which is gelling (cross-linking) by adding a basic solution acting as a catalyst. Pore size is governed in particular by the respective concentrations by weight in the sols and the concentration of catalysts. Step 3 can include depositing the gels on a plate, for example, or in a mold having the desired shape. A solvent exchange operation may be used to replace any water that might still be present with an organic solvent of the acetone type. The method may then continue with drying using sub- or super-critical carbon dioxide. Depending on the drying method used, the gel is referred to as an aerogel (supercritical drying), a xerogel (drying by evaporation), or a cyrogel (drying by lyophilization). This is followed by step 4, which is pyrolysis at a temperature in the range of 500 to 1500° C. (more commonly 800-1,200° C.) under an inert atmosphere.

The carbon aerogel electrode of the instant invention generally presents total porosity in the range of 70% to 95% by volume. Pores known as "transport pores" corresponding to macropores and mesopores generally represent porosity in the range 70% to 90% of the total volume. The term "mesopores" corresponds to pores having a diameter in the range 2 nanometers (nm) to 50 nm, while the term "macropores" corresponds to pores having a diameter greater than 50 nm. The macro-pores or meso-pores correspond to the spaces between the particles. Total porosity and macro- or meso-porosity are measured by helium pycnometry taking respectively the relative density of the material (amorphous carbon) as being 2 and the relative density of the individual carbon particles as evaluated by small angle X-ray scattering (SAXS) as being 1.4.

The specific surface area of the macro-mesopores is measured by the nitrogen adsorption technique (t-plot technique) and the mean pore size is calculated from this value by assuming that the individual particles are spherical and mono-dispersed. In an embodiment, the specific surface area of the macro-mesopores lies in the range 30 $m^2/g$ to 300 $m^2/g$, which can be increased to >1,500 $m^2/g$ through activation.

Organic aerogels can be made from resorcinol formaldehyde, phenol formaldehyde, melamine formaldehyde, cresol formaldehyde, phenol furfuryl alcohol, polyacrylamides, polyacrylonitriles, polyacrylates, polycyanurates, polyfurfural alcohol, polyimides, polystyrenes, polyurethanes, polyvinyl alcohol dialdehyde, epoxies, agar agar, agarose, and many others. These organic aerogels (e.g. from phenol formaldehyde resin) can be subjected to heat treatments in a temperature range of 500 to 1,500° C. to obtain carbon aerogels and related carbon gel or foam materials. Various graphene (NGP) or carbon nanotube (CNT) materials discussed earlier can be mixed with the precursors to organic aerogels to form graphene- or nanotube-enhanced organic aerogels, which are then subjected to heat treatments to obtain graphene- or nanotube-enhanced carbon aerogel. The carbon aerogel, with or without graphene or CNT, may be optionally subjected to a graphitization treatment at a temperature of 1,500-3,200° C. With such a treatment, some carbon aerogel (with or without the enhancing graphene sheets or CNT) can be converted into a meso-porous structure having graphene sheets dispersed in a carbon matrix. The carbon aerogels are typically meso-porous, enabling liquid electrolyte to reach the edges or surfaces of the constituent aromatic rings or graphene sheets after the SMC device is made. Such an arrangement enables the lithium ions in the liquid to readily deposit onto graphene surfaces without having to undergo solid-state diffusion.

In summary, the anode active material of the presently invented SMC may be selected from (a) a porous disordered carbon material selected from a soft carbon, hard carbon, polymeric carbon or carbonized resin, meso-phase carbon, coke, carbonized pitch, carbon black, activated carbon, or partially graphitized carbon; (b) a graphene material selected from a single-layer sheet or multi-layer platelet of graphene, graphene oxide, graphene fluoride, hydrogenated graphene, nitrogenated graphene, boron-doped graphene, nitrogen-doped graphene, functionalized graphene, or reduced graphene oxide; (c) exfoliated graphite; (d) meso-porous carbon; (e) a non-functionalized carbon nanotube selected from a single-walled carbon nanotube or multi-walled carbon nanotube; (f) a carbon nano-fiber, (g) carbon gel or foam (including graphene-enhanced carbon aerogel and nanotube-enhanced carbon aerogel), or a combination thereof.

The following examples serve to illustrate the preferred embodiments of the present invention and should not be construed as limiting the scope of the invention:

EXAMPLE 1

Production of Molybdenum Diselenide Nano Platelets Using Direct Ultrasonication

A sequence of steps can be utilized to form nano platelets from many different types of layered compounds: (a) dispersion of a layered compound in a low surface tension solvent or a mixture of water and surfactant, (b) ultrasonication, and (c) an optional mechanical shear treatment.

For instance, dichalcogenides ($MoSe_2$) consisting of Se—Mo—Se layers held together by weak van der Waals forces can be exfoliated via the direct ultrasonication process invented by our research group. Intercalation can be achieved by dispersing $MoSe_2$ powder in a silicon oil beaker, with the resulting suspension subjected to ultrasonication at 120 W for two hours. The resulting $MoSe_2$ platelets were found to have a thickness in the range of approximately 1.4 nm to 13.5 nm with most of the platelets being mono-layers or double layers.

Other single-layer platelets of the form $MX_2$ (transition metal dichalcogenide), including $MoS_2$, $TaS_2$, $ZrS_2$, and $WS_2$, were similarly exfoliated and separated. Again, most of the platelets were mono-layers or double layers when a high sonic wave intensity was utilized for a sufficiently long ultra-sonication time.

EXAMPLE 2

Production of $ZrS_2$ Nano Discs

In a representative procedure, zirconium chloride ($ZrCl_4$) precursor (1.5 mmol) and oleylamine (5.0 g, 18.7 mmol) were added to a 25-mL three-neck round-bottom flask under a protective argon atmosphere. The reaction mixture was first heated to 300° C. at a heating rate of 5° C./min under argon flow and subsequently $CS_2$ (0.3 mL, 5.0 mmol) was injected. After 1 h, the reaction was stopped and cooled down to room temperature. After addition of excess butanol and hexane mixtures (1:1 by volume), 18 nm $ZrS_2$ nano discs (~100 mg) were obtained by centrifugation. Larger sized nano discs $ZrS_2$ of 32 nm and 55 nm were obtained by changing reaction time to 3 h and 6 h, respectively otherwise under identical conditions.

EXAMPLE 3

Preparation of Boron Nitride Nano Sheets

Five grams of boron nitride (BN) powder, ground to approximately 20 μm or less in sizes, were dispersed in a strong polar solvent (dimethyl formamide) to obtain a suspension. An ultrasonic energy level of 85 W (Branson 5450 Ultrasonicator) was used for exfoliation, separation, and size reduction for a period of 1-3 hours. This is followed by centrifugation to isolate the BN nano sheets. The BN nano sheets obtained were from 1 nm thick (<3 atomic layers) up to 7 nm thick.

EXAMPLE 4

Preparation of Inorganic BN Cathode-Based SMCs

Coin cells using BN as a cathode active material (75% BN nano sheets, 15% carbon black as a conductive additive, and 10% PVDF as a resin binder) and nano graphene as a nano-structured anode (plus a thin piece of lithium foil as a lithium source implemented between a current collector and a separator layer) were made and tested. A series of coin cells, Sample BN-1 to BN-7, were made that contain BN nano sheets of different thicknesses, resulting in cathodes of different specific surface areas. In all cells, the separator used was one sheet of micro-porous membrane (Celgard 2500). The current collector for the cathode was a piece of carbon-coated aluminum foil and that for the anode was Cu foil. The electrolyte solution was 1 M $LiPF_6$ dissolved in a mixture of ethylene carbonate (EC) and dimethyl carbonate (DMC) with a 3:7 volume ratio. The separator was wetted by a minimum amount of electrolyte to reduce the background current. Cyclic voltammetry and galvanostatic measurements of the lithium cells were conducted using an Arbin 32-channel supercapacitor-battery tester at room temperature (in some cases, at a temperature as low as −40° C. and as high as 60° C.).

COMPARATIVE EXAMPLE 4A

A Lithium-Ion Cell Containing BN Nano Sheets as an Anode Active Material and $LiCoO_2$ as a Cathode Active Material As a reference sample (Sample Li-Ion-BN), similar coin cells, containing the same BN nano sheets as an anode active material and $LiCoO_2$ as a cathode active material, were also made and tested. This is a prior art lithium-ion battery.

COMPARATIVE EXAMPLE 4B

A Lithiated CNT/CNT Lithium-Ion Capacitor Cell and a SMC Containing a Reduced Graphene Oxide (RGO) Cathode and a RGO Anode As another reference sample (L-CNT/CNT), similar coin cells but containing lithiated single-wall carbon nanotubes (SWNT) as an anode active material and non-lithiated SWNTs as a cathode active material, were also made and tested. Hipco SWNTs were treated with $N_2O$ at 2 L/min for 5 minutes at 600° C. In a sample, 22 mg of the treated SWNTs and 10 mg of surface-passivated lithium micro particles (SLMP from FMC Corp.) were combined with 15 mL of anhydrous xylene. The mixture was sonicated for 1 hour and the resulting mixture was vacuum-filtered in a glovebox to produce a CNT paper. This sheet of "lithiated" CNT paper was cut into small pieces, which were used as an anode active material. Pieces of CNP paper containing no SLMP were used as a cathode active material to form a lithiated CNT/CNT cell. Such an L-CNT/CNT cell appears to behave like a lithium-ion capacitor.

Chemically reduced graphene oxide (RGO) sheets supplied from Angstron Materials, Inc. were also made into reduced graphene oxide paper in a similar manner, but without mixing with SLMP. A sheet of thin lithium foil was disposed between a RGO powder-coated Cu foil (as an anode current collector) and a porous separator, which was stacked against a sheet of RGO paper to prepare a RGO-based SMC cell. A piece of Al foil was used as a cathode current collector.

EXAMPLE 5

Preparation of Inorganic $ZrS_2$ Cathode-Based SMCs

Coin cells using $ZrS_2$ as a cathode active material (75% $ZrS_2$ nano sheets as prepared in Example 2, 15% carbon black as a conductive additive, and 10% PVDF as a resin binder) and nano graphene as a nano-structured anode (plus a thin piece of lithium foil as a lithium source implemented between a current collector and a separator layer) were made and tested. In all cells, the separator used was one sheet of microporous membrane (Celgard 2500). The current collector for the cathode was a piece of carbon-coated aluminum foil and that for the anode was Cu foil. The electrolyte solution was 1 M $LiPF_6$ dissolved in a mixture of ethylene carbonate (EC) and dimethyl carbonate (DMC) with a 3:7 volume ratio. The separator was wetted by a minimum amount of electrolyte to reduce the background current. Cyclic voltammetry and galvanostatic measurements of the lithium cells were conducted using an Arbin 32-channel supercapacitor-battery tester at room temperature (in some cases, at a temperature as low as −40° C. and as high as 60° C.).

COMPARATIVE EXAMPLE 5A

A Lithium-Ion Cell Containing $ZrS_2$ Nano Discs as an Anode Active Material and $LiCoO_2$ as a Cathode Active Material As a reference sample (Sample Li-Ion-ZrS), similar coin cells containing the same $ZrS_2$ nano discs as an anode active material and $LiCoO_2$ as a cathode active material, were also made and tested. This is a prior art lithium-ion battery.

COMPARATIVE EXAMPLE 5B

Graphene-Based Symmetric Supercapacitor and Pristine Graphene Cathode SMC

A SMC cell similar to the RGO-based SMC was also made from a sheet of pristine graphene material as a cathode active material and a pristine graphene powder-coated Cu foil as an anode current collector. Again, a sheet of lithium foil was implemented between the graphene-coated Cu foil and the separator layer.

Galvanostatic charge-discharge studies of various cells have enabled us to obtain significant data as summarized in the Ragone plot of FIG. 6 and FIG. 7. These plots allow us to make the following observations:

(a) Both the inorganic and graphene-based SMC cells exhibit significantly higher energy densities and power densities than those of the corresponding lithium-ion battery and symmetric supercapacitors. The high surface areas (>>100 $m^2/g$) in both types of cathode active materials are capable of capturing massive amounts of lithium ions during the discharge of an SMC cell.

The presence of a nano-structured anode (in addition to the nano-structured cathode) enables high rates of lithium ion deposition onto and release from the massive surface areas of the anode during the re-charge and discharge cycles, respectively.

The symmetric supercapacitor (data shown as the far left curve of FIG. 6) is composed of a graphene anode and a graphene cathode, having no lithium foil as a lithium source. This EDL supercapacitor does not require long-range transport of the charges (in particular, requiring no exchange of lithium ions between the anode and the cathode). The amounts of lithium ions and their counter-ions (anions) are limited by the solubility of a lithium salt in the solvent. The amounts of lithium that can be captured and stored in the active material surfaces of the cathode are dramatically higher than this solubility limit.

(b) As mentioned earlier in the Background section, the power density of a state-of-the-art supercapacitor is typically of 5-8 kW/Kg, but that of a lithium-ion battery is 100-500 W/kg. This implies that the presently invented surface-mediated lithium ion-exchanging cells have a power density (23-31 kW/Kg) that is 4-6 times higher than those of supercapacitors and 60 times higher than those of conventional lithium-ion batteries.

(c) The SMC based on an inorganic cathode performs significantly better than the corresponding pristine graphene or reduced graphene oxide cathode-based SMCs in terms of the maximum achievable energy density. These maximum energy density values (310 Wh/kg for $ZrS_2$ nano disc cathode-based SMC and 262 Wh/kg for BN nano sheet cathode-based SMC) are significantly higher than those (150 Wh/kg) of conventional lithium-ion batteries and 50-60 times higher than those of activated carbon-based EDL supercapacitors.

The cell composed of a lithiated CNT-based anode active material and a CNT-based cathode exhibits an energy density just slightly better than that of a lithium-ion capacitor, but an order of magnitude lower than those of SMCs. Even though SWNTs have a theoretical specific surface area of 1300 $m^2/g$, SWNT-based electrode (having closely packed CNT bundles) tends to have a very low specific surface area. Our experimental data indicate that the SWNT-based cathode paper has a specific surface area of approximately 78 $m^2/g$. Further, the lithiated CNT anode might have retained a significant proportion of the lithium atoms that were lithiated into the interstitial sites of CNT bundles at the anode. This possibly implies that there was significant capacity irreversibility in the CNT anode and there was a significantly reduced amount of lithium ions being shuttled between the interior of CNT anode bundles and the interior of CNT cathode bundles.

Both FIG. 6 and FIG. 7 have clearly demonstrated that inorganic nano materials (nano discs, nano platelets, or nano sheets) when used as a cathode active material of an SMC exhibit power densities that are 2-3 orders of magnitude higher than those of the corresponding lithium-ion cells using the same nano materials as an anode active material. This is undeniably beyond and above what a person of ordinary or extra-ordinary ability in the art would expect.

Figure 8:
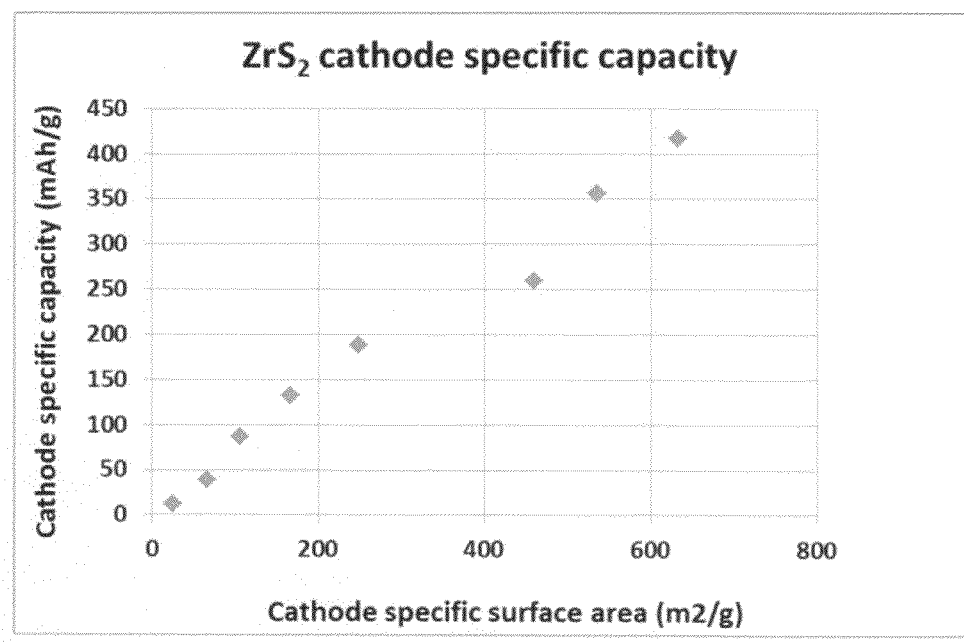
FIG. 8 The specific capacity values plotted as a function of the specific surface areas of various inorganic SMC cathodes.

(d) The specific surface area of the inorganic cathode electrode (not just the area of the cathode active material) was found to play a critical role in dictating the energy density and power density of a SMC cell, as demonstrated in FIG. 8.

(e) Our charge-discharge curves further indicate that the charge and discharge times for inorganic cathode-based SMCs can be as short as seconds.

In conclusion, the instant invention provides a revolutionary energy storage device that has exceeded the best features of both the supercapacitor and the lithium ion battery. These surface-mediated cells, with their materials and structures yet to be optimized, are already capable of storing an energy density of >300 Wh/$kg_{cell}$, which is 60 times higher than that of conventional electric double layer (EDL) supercapacitors. The power density of 31 kW/$kg_{cell}$ (achievable up to this point for inorganic cathode-based SMC) is 5 times higher than that (6 kW/$kg_{cell}$) of conventional EDL supercapacitors and 30-60 times higher than that (0.5-1.0 kW/$kg_{cell}$) of conventional lithium-ion batteries. These surface-mediated cells can be re-charged in seconds, as opposed to hours for conventional lithium ion batteries. This is truly a major breakthrough and revolutionary technology.

We claim:

1. An inorganic material surface-mediated, lithium ion-exchanging cell (SMC) comprising:
   (a) A positive electrode (cathode) comprising a non-carbon-based inorganic cathode active material having a surface area to capture and store lithium thereon, wherein said non-carbon-based cathode active material consists of nano discs, nano platelets, or nano sheets of an inorganic material selected from: (A) bismuth selenide or bismuth telluride, (B) transition metal dichalcogenide or trichalcogenide, (C) sulfide, selenide, or telluride of niobium, zirconium, molybdenum, hafnium, tantalum, tungsten, titanium, cobalt, manganese, iron, nickel, or a transition metal; (D) boron nitride, or (E) a combination thereof; wherein said nano discs, nano platelets, or nano sheets have a thickness less than 100 nm;
   (b) A negative electrode (anode) comprising an anode current collector alone or both an anode current collector and an anode active material having a surface area to capture or store lithium thereon;
   (c) A porous separator disposed between the anode and the cathode;
   (d) A lithium-containing electrolyte in physical contact with the two electrodes, wherein said cathode has a specific surface area no less than 100 m²/g which is in direct physical contact with said electrolyte to receive lithium ions therefrom or to provide lithium ions thereto; and
   (e) A lithium source disposed in at least one of the two electrodes or pre-lithiated into or onto said anode when the cell is made; wherein the cell is essentially intercalation free.

2. The SMC cell of claim 1 wherein said cell contains no oxygen.

3. An inorganic material surface-mediated, lithium ion-exchanging cell (SMC) comprising:
   (a) A positive electrode (cathode) comprising a non-carbon-based inorganic cathode active material having a surface area to capture and store lithium thereon, wherein said non-carbon-based cathode active material consists of nano discs, nano platelets, or nano sheets of an inorganic material selected from $LiCoO_2$, $V_2O_5$, $V_6O_{13}$, $LiV_3O_8$, $LiNi_{1-y}Co_yO_2$, $LiNi_yMn_yCo_{1-2y}O_2$, $MnO_2$, $CoO_2$, $NiO_2$, or $MoO_3$, having a thickness less than 100 nm;
   (b) A negative electrode (anode) comprising an anode current collector alone or both an anode current collector and an anode active material having a surface area to capture or store lithium thereon;
   (c) A porous separator disposed between the anode and the cathode;
   (d) A lithium-containing electrolyte in physical contact with the two electrodes, wherein said cathode has a specific surface area no less than 100 m²/g which is in direct physical contact with said electrolyte to receive lithium ions therefrom or to provide lithium ions thereto; and
   (e) A lithium source disposed in at least one of the two electrodes or pre-lithiated into or onto said anode when the cell is made; wherein the cell is essentially intercalation free.

4. The SMC cell of claim 1 wherein said non-carbon-based cathode active material has a specific surface area no less than 200 m²/g which is in direct physical contact with said electrolyte, or said nano discs, nano platelets, or nano sheets have a thickness less than 20 nm.

5. The SMC cell of claim 1 wherein said non-carbon-based cathode active material has a specific surface area no less than 500 m²/g which is in direct physical contact with said electrolyte, or said nano discs, nano platelets, or nano sheets have a thickness less than 10 nm.

6. The SMC cell of claim 1 wherein said cathode active material contains a single-layer boron nitride sheet.

7. The SMC cell of claim 1 wherein said cathode active material contains a zirconium disulfide nano disc having a thickness less than 100 nm.

8. The SMC cell of claim 1 wherein said cathode further contains a conductive additive and said cathode forms a meso-porous structure having a pore size in the range of 2 nm and 50 nm.

9. The SMC cell of claim 1 wherein said cathode further contains a resin binder that bonds said nano discs, nano platelets, or nano sheets together.

10. The SMC cell of claim 1 wherein said cathode further contains a conductive filler selected from graphite or carbon particles, carbon black, expanded graphite, graphene, carbon nanotube, carbon nano-fiber, carbon fiber, conductive polymer, or a combination thereof.

11. The SMC cell of claim 1, wherein the lithium source comprises a lithium chip, lithium alloy chip, lithium foil, lithium alloy foil, lithium powder, lithium alloy powder, surface stabilized lithium particles, a mixture of lithium metal or lithium alloy with a lithium intercalation compound, lithium or lithium alloy film coated on a surface of an anode or cathode active material, or a combination thereof.

12. The SMC cell of claim 1, wherein said cell has an open-circuit voltage of at least 1.5 volts.

13. The SMC cell of claim 1, wherein at least one of the anode current collector or cathode current collector is a porous, electrically conductive material selected from metal foam, metal web or screen, perforated metal sheet, metal fiber mat, metal nanowire mat, porous conductive polymer film, conductive polymer nano-fiber mat or paper, conductive polymer foam, carbon foam, carbon aerogel, carbon xerox gel, graphene foam, graphene oxide foam, reduced graphene oxide foam, carbon fiber paper, graphene paper, graphene oxide paper, reduced graphene oxide paper, carbon nano-fiber paper, carbon nano-tube paper, or a combination thereof.

14. The SMC cell of claim 1 wherein said anode active material is selected from: (a) porous disordered carbon material selected from a soft carbon, hard carbon, polymeric carbon or carbonized resin, meso-phase carbon, coke, carbonized pitch, carbon black, activated carbon, or partially graphitized carbon; (b) graphene material selected from a single-layer sheet or multi-layer platelet of graphene, graphene oxide having less than 5% by weight oxygen, graphene fluoride, hydrogenated graphene, nitrogenated graphene, boron-doped graphene, nitrogen-doped graphene, functionalized graphene, or reduced graphene oxide; (c) exfoliated graphite; (d) meso-porous carbon; (e) non-functionalized and non-oxidized carbon nanotube; (f) non-functionalized carbon nano-fiber, (g) carbon aerogel or carbon foam, or a combination thereof.

15. The SMC cell of claim 1, wherein said anode has a specific surface area no less than 100 $m^2/g$.

16. The SMC cell of claim 1, wherein a discharge operation of said cell involves both lithium intercalation into an interior of said cathode active material and lithium adsorption on surfaces of said cathode active material.

17. The SMC cell of claim 1, wherein the electrolyte is organic liquid electrolyte, ionic liquid electrolyte, or gel electrolyte containing a first amount of lithium ions when said cell is made.

18. The SMC cell of claim 17, wherein an operation of said cell involves an exchange of a second amount of lithium ions between said cathode and said anode and said second amount of lithium is greater than said first amount.

19. The SMC cell of claim 1, wherein said anode active material is not intercalated or de-intercalated with lithium when said cell is in operation.

20. The SMC cell of claim 1, wherein at least one of the two electrodes has a specific surface area of no less than 1,000 $m^2/g$ that is in direct contact with said electrolyte.

21. The SMC cell of claim 1, wherein said anode active material is pre-loaded with lithium before or when the cell is made.

22. The SMC cell of claim 1, wherein said anode active material is prelithiated with a surface area being pre-coated or pre-plated with lithium before or when said cell is made.

23. The SMC cell of claim 1 wherein said electrolyte comprises an organic liquid electrolyte, gel electrolyte, a lithium salt-containing ionic liquid, or a combination thereof.

24. The SMC cell of claim 1 wherein said positive electrode has a thickness greater than 100 μm.

25. The SMC cell of claim 1 wherein said lithium source contains an amount of lithium sufficient for said anode to retain a non-zero lithium content equivalent to at least 10% of the total anode weight, including said anode current collector and anode active material weights combined, when said device is discharged.

26. The SMC cell of claim 1 wherein said lithium source is selected from lithium metal, a lithium metal alloy, a mixture of lithium metal or lithium alloy with a lithium intercalation compound, a lithiated compound, lithiated titanium dioxide, lithium titanate, lithium manganate, a lithium transition metal oxide, $Li_4Ti_5O_{12}$, or a combination thereof.

27. The SMC cell of claim 26, wherein the lithium intercalation compound or lithiated compound is selected from the following groups of materials:
   (a) Lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof;
   (b) Lithiated alloys or intermetallic compounds of Si, Ge, Sn, Pb, Sb, Bi, Zn, Al, Ti, Co, Ni, Mn, Cd, and their mixtures;
   (c) Lithiated oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof, and
   (d) Lithiated salts or hydroxides of Sn.

28. A SMC device comprising at least two SMC cells of claim 1 connected in series or in parallel.

29. A SMC device comprising at least one SMC cell of claim 1, which is electrically connected to an electrochemical cell in series or in parallel.

* * * * *